United States Patent
Botha et al.

(10) Patent No.: US 11,194,576 B1
(45) Date of Patent: Dec. 7, 2021

(54) AUTOMATING COMPLEX PROCESSES

(71) Applicant: Audet Magna Limited, Chelmsford (GB)

(72) Inventors: Tielman Francois Botha, Berkshire (GB); Dawid Eduard Botha, Durbanville (ZA); Philip Viljoen, Centurion (ZA)

( * ) Notice: Subject to any disclaimer, the term of this patent is extended or adjusted under 35 U.S.C. 154(b) by 0 days.

(21) Appl. No.: 17/351,109

(22) Filed: Jun. 17, 2021

(30) Foreign Application Priority Data

| Jan. 29, 2021 | (GB) | 2101293 |
| Jan. 29, 2021 | (GB) | 2101294 |
| Jan. 29, 2021 | (GB) | 2101295 |
| Jan. 29, 2021 | (GB) | 2101297 |
| Apr. 23, 2021 | (GB) | 2105870 |

(51) Int. Cl.
  *G06F 8/20* (2018.01)
  *G06F 9/30* (2018.01)
  (Continued)

(52) U.S. Cl.
  CPC ............ *G06F 9/3005* (2013.01); *G06F 8/41* (2013.01); *G06F 8/51* (2013.01); *G06K 9/6259* (2013.01); *G06N 20/00* (2019.01)

(58) Field of Classification Search
  CPC ............ G06F 9/3005; G06F 8/41; G06F 8/51; G06N 20/00; G06K 9/6259
  See application file for complete search history.

(56) References Cited

U.S. PATENT DOCUMENTS 6,810,294 B2 * 10/2004 Rangachari ........ G05B 19/4188
  700/97
8,301,480 B2 * 10/2012 Ramachandran .. G06Q 10/0633
  705/7.27
(Continued)

OTHER PUBLICATIONS

Microsoft, C++ Tutorial: Debugging Overview, 2017, Microsoft, pp. 1-8.*

*Primary Examiner* — Cheng Yuan Tseng
(74) *Attorney, Agent, or Firm* — Bochner IP, PLLC; Andrew D. Bochner

(57) ABSTRACT

The present disclosure relates to A method of automating a process to process a task or an object comprising: defining elements of the process in one or more human-intelligible and editable and machine interpretable workflow program documents, the workflow program documents each including a plurality of actors who perform actions or take decision, a sequence of action steps each associated with an actor and having at least one expected outcome and a corresponding next step for each expected outcome, and wherein the action steps may include a first type of action further defined within the workflow program documents and a second type of action implemented by a computer according to code defined other than in said workflow program documents; and executing the process by a processor running the code defined by the workflow program documents, wherein if an exception is detected in the processing of a task or object according to the code, the exception is passed to a supervisory function to perform a remedial action, wherein the available remedial actions include individually modifying the task or object to be processed or on the fly patching or modifying of the workflow program documents, wherein the modified workflow program documents are interpreted or re-compiled whereby the processor subsequently executes a modified process according to the modified document.

29 Claims, 16 Drawing Sheets

(51) Int. Cl.
   *G06N 20/00*   (2019.01)
   *G06F 8/51*    (2018.01)
   *G06F 8/41*    (2018.01)
   *G06K 9/62*    (2006.01)

(56) References Cited

U.S. PATENT DOCUMENTS

| | | | | |
|---|---|---|---|---|
| 8,332,248 | B2* | 12/2012 | Hutchinson | G06Q 10/00 |
| | | | | 705/7.11 |
| 8,725,678 | B2* | 5/2014 | Rangadass | G06Q 10/087 |
| | | | | 707/607 |
| 9,665,437 | B2* | 5/2017 | Bhargava | G06F 11/1451 |
| 10,796,256 | B2* | 10/2020 | Brayton | G06Q 10/0633 |
| 11,062,246 | B2* | 7/2021 | Patel | G06F 8/35 |
| 11,064,073 | B2* | 7/2021 | Kadakia | H04M 3/5133 |
| 2009/0327002 | A1* | 12/2009 | Chapman | G06Q 10/06 |
| | | | | 705/7.27 |
| 2010/0223557 | A1* | 9/2010 | Kenney | G06Q 10/10 |
| | | | | 715/736 |
| 2020/0111188 | A1* | 4/2020 | Mccallum | G06Q 50/205 |
| 2021/0149655 | A1* | 5/2021 | Mathews | G06Q 10/063 |
| 2021/0185173 | A1* | 6/2021 | Kadakia | H04M 3/5231 |

\* cited by examiner

| Ref | Label | Condition | Actor | Action Step 1 | Comms | Action Step 1 Output |
|---|---|---|---|---|---|---|
| 1 | choosePart | * | Sales | | | |
| 2 | choosePart | * | Sales | | | |
| 3 | choosePart | * | Sales | | | |
| 4 | choosePart | * | Sales | | | |
| 5 | sendToSales | * | Sales | Routing | E01 | Send to Manufacturing |
| 6 | sendToSales | Status="Prototype" | Sales | Routing | E01 | Send to QA |
| 7 | sendToSales | Status="Prototype" | Sales | Routing | E01 | Add Additional Components |
| 8 | sendToSales | Status="Complete" | Sales | Routing | E01 | Send for Painting |
| 9 | sendToSales | * | Sales | Routing | E01 | Cancel Sale |
| 10 | sendToQA | * | QA | Approval | E02 | Approved |
| 11 | sendToQA | * | QA | Approval | E02 | Approved |
| 12 | sendToQA | * | QA | Approval | E02 | Rejected |
| 13 | sendToManufacturing | * | Manufacturing | Approval | E03 | Approved |
| 14 | sendToManufacturing | * | Manufacturing | Approval | E03 | Approved |
| 15 | sendToManufacturing | * | Manufacturing | Approval | E03 | Rejected |
| 16 | sendToAdditionalDept | * | Additional Dept | Routing | E05 | Send to Manufacturing to place |
| 17 | sendToAdditionalDept | * | Additional Dept | Routing | E05 | Place additional components |
| 18 | sendToAdditionalDept | * | Additional Dept | Routing | E05 | Rejected |
| 19 | sendToPaintShop | * | Paintshop | | | |
| 20 | sendToPaintShop | * | Paintshop | | | |
| 21 | sendForFinalQA | * | QA | Approval | E06 | Approved |
| 22 | sendForFinalQA | * | QA | Approval | E06 | Rejected |
| 23 | sendToShipping | | Sales | | | |
| 24 | exception | * | Administrator | Complete Form | E99 | Admin Rescue |

TYPE 1 ACTION

FIG. 3A

| Ref | Action Step 2 | Action Step 2 Options | Dependency | Action Step 2 Output | Outcome | Next Step Label |
|---|---|---|---|---|---|---|
| 1 | Part Lookup | | Yes | Off the shelf item | Success | sendToFulfilment |
| 2 | Part Lookup | PATH | Yes | Off the shelf requiring paint | Success | sendToPaintshop |
| 3 | Part Lookup | | Yes | Custom Manufacture | Success | sendToSales |
| 4 | Part Lookup | | Yes | * | Failure | exception |
| 5 | | SEQUENCE | | | | sendToManufacturing |
| 6 | | | | | | sendToQA |
| 7 | Choose Additional Parts | | | | | sendToAdditionalDept |
| 8 | | | | | | sendToPaintshop |
| 9 | | | | | | complete |
| 10 | Create Certificate of Quality | Part.Status|Complete | Yes | * | Success | sendToSales |
| 11 | Create Certificate of Quality | | Yes | * | Failure | exception |
| 12 | | | | | | sendToSales |
| 13 | Manufacture Part | | No | * | Success | sendToQA |
| 14 | Manufacture Part | | No | * | Failure | exception |
| 15 | | | | | | sendToSales |
| 16 | Pick and Send | | Yes | | Success | sendToManufacturing |
| 17 | Pick and Place | | Yes | | Success | sendToSales |
| 18 | | | | | | sendToOtherReviewer |
| 19 | Painting | | | | Success | sendForFinalQA |
| 20 | Painting | | | | Failure | sendToSales |
| 21 | | | | | | sendToShipping |
| 22 | | | | | | sendToSales |
| 23 | Ship Part | | | | | complete |
| 24 | Custom Rescue Actions | | No | * | * | Re-entry Label |

TYPE 2 ACTION

FIG. 3B

| Ref | Label | Actor | Action Step 1 | Action Step 1 Output | Action Step 2 | Action Step 2 Output | Outcome | Next-Step Label |
|---|---|---|---|---|---|---|---|---|
| 1 | choosePart | Sales | | | Part Lookup | Off the shelf item | Success | sendToManufacturing |
| 2 | choosePart | Sales | | | Part Lookup | item requires paint | Success | sendToPaintshop |
| 3 | choosePart | Sales | | | Part Lookup | Custom Manufacture | Success | sendToSales |
| 4 | choosePart | Sales | | | Part Lookup | * | Failure | exception |
| 5 | sendToSales | Sales | Routing | Send to Manufacturing | | | | sendToManufacturing |
| 6 | sendToSales | Sales | Routing | Send to QA | | | | sendToQA |
| 7 | sendToSales | Sales | | Add Additional Component | Choose Additional Parts | | | sendToAdditionalDept |
| 8 | sendToSales | Sales | Routing | Send for Painting | | | | sendToPaintshop |
| 9 | sendToSales | Sales | Routing | Cancel Sale | | | | complete |
| 10 | sendToQA | QA | Approval | Approved | Create Certificate | * | Success | sendToSales |
| 11 | sendToQA | QA | Approval | Approved | Create Certificate | * | Failure | exception |
| 12 | sendToQA | QA | Approval | Rejected | | | | sendToSales |
| 13 | sendToManufacturing | Manufacturing | Approval | Approved | Manufacture Part | * | Success | sendToQA |
| 14 | sendToManufacturing | Manufacturing | Approval | Approved | Manufacture Part | * | Failure | exception |
| 15 | sendToManufacturing | Manufacturing | Approval | Rejected | | | | sendToSales |
| 16 | sendToAdditionalDept | Additional Dept | Routing | Send to Manufacturing to place | Pick and Send | | Success | sendToManufacturing |
| 17 | sendToAdditionalDept | Additional Dept | Routing | Place additional components | Pick and Place | | Success | sendToSales |
| 18 | sendToAdditionalDept | Additional Dept | Routing | Rejected | | | | sendToOtherReviewer |
| 19 | sendToPaintShop | Paintshop | | Painting | | | Success | sendForFinalQA |
| 20 | sendToPaintShop | Paintshop | | Painting | | | Failure | sendToSales |
| 21 | sendForFinalQA | QA | Approval | Approved | | | Success | sendToShipping |
| 22 | sendForFinalQA | QA | Approval | Rejected | | | | sendToSales |
| 23 | sendToShipping | Sales | | | Ship Part | | | complete |
| 24 | exception | Administrator | Complete Form | Admin Rescue | Custom Rescue Actions | * | | Re-entry Label |

FIG. 5

| Ref | Label | Condition | Actor | Action Step 1 | Comm | Action Step 1 Output |
|---|---|---|---|---|---|---|
| 1 | start | * | Sales | | | |
| 2 | start | * | Sales | | | |
| 3 | start | * | Sales | | | |
| 4 | start | * | Sales | | | |
| 5 | start | * | Sales | | | |
| 6 | sendToSales | * | Sales | Routing | E01 | Send to Commercial |
| 7 | sendToSales | * | Sales | Routing | E01 | Send to Legal |
| 8 | sendToSales | * | Sales | Routing | E01 | Send to Other Reviewer |
| 9 | sendToSales | value>5000 | Sales | Routing | E01 | Send to customer |
| 10 | sendToSales | * | Sales | Routing | E01 | Send for Signature |
| 11 | sendToSales | * | Sales | Routing | E01 | Void document |
| 12 | sendForSignatures | * | Sales | | | |
| 13 | sendForSignatures | * | Sales | | | |
| 14 | sendForSignatures | * | Sales | | | |
| 15 | sendToLegal | * | LegalQueue | Routing | E02 | Rejected |
| 16 | sendToLegal | * | LegalQueue | Routing | E02 | Approved |
| 17 | sendToLegal | contractType=="CA" | LegalQueue | Routing | E02 | Send to Commercial |
| 18 | sendToCommercial | * | Commercial | Routing | E03 | Rejected |
| 19 | sendToCommercial | * | Commercial | Routing | E03 | Approved |
| 20 | sendToCommercial | * | Commercial | Routing | E03 | Send to Legal |
| 21 | sendToFulfillment | * | LegalQueue | Review | E04 | |
| 22 | sendToOtherReviewer | * | Other | Routing | E07 | Approved |
| 23 | sendToOtherReviewer | * | Other | Routing | E07 | Rejected |
| 24 | exception | * | Administrator | Complete Form | E99 | Admin Rescue |

FIG. 6A

| Ref | Action Step 2 | Action Step 2 Options | Dependency | Action Step 2 Output | Outcome | Next-Step Label |
|---|---|---|---|---|---|---|
| 1 | Add Document | | Yes | Internal review | Success | sendToSales |
| 2 | Add Document | PATH | Yes | Get customer signature | Success | sendForSignatures |
| 3 | Add Document | | Yes | Save as Executed | Success | sendToFulfillment |
| 4 | Add Document | | Yes | Internal review | Failure | exception |
| 5 | Add Document | | Yes | Get customer signature | Failure | exception |
| 6 | | | | | | sendToCommercial |
| 7 | | | | | | sendToLegal |
| 8 | Choose Other Reviewer | | Yes | | Success | sendToOtherReviewer |
| 9 | Customer Review | | Yes | | Success | sendToSales |
| 10 | Add Document | | | | | sendForSignatures |
| 11 | | | | | | exception |
| 12 | Signatures | | Yes | | Success | sendToFulfillment |
| 13 | Signatures | SEQUENCE | Yes | Requires Update | Failure | sendToSales |
| 14 | Signatures | | Yes | Requires Legal Advice | Failure | sendToLegal |
| 15 | | | | | | sendToSales |
| 16 | Update Metadata | Approvals.Legal\|True | No | | Success | sendToSales |
| 17 | | | | | | sendToCommercial |
| 18 | | | | | | sendToSales |
| 19 | Update Metadata | Approvals.Commercial\|True | No | | Success | sendToSales |
| 20 | | | | | | sendToLegal |
| 21 | | | | | | complete |
| 22 | Update Metadata | Approvals.Other\|True | No | | Success | sendToSales |
| 23 | | | | * | * | sendToSales |
| 24 | Custom Rescue Actions | | No | | | Re-entry Label |

TYPE 2 ACTION

FIG. 6B

| Ref | Label | Actor | Action Step 1 | Action Step 1 Output | Action Step 2 | Action Step 2 Output | Outcome | Next Step Label |
|---|---|---|---|---|---|---|---|---|
| 1 | start | Sales | | | Add Document | Internal review | Success | sendToSales |
| 2 | start | Sales | | | Add Document | Get customer signature | Success | sendForSignatures |
| 3 | start | Sales | | | Add Document | Save as Executed | Success | sendToFulfillment |
| 4 | start | Sales | | | Add Document | Internal review | Failure | exception |
| 5 | start | Sales | | | Add Document | Get customer signature | Failure | exception |
| 6 | sendToSales | Sales | Routing | Send to Commercial | | | Success | sendToCommercial |
| 7 | sendToSales | Sales | Routing | Send to Legal | | | Success | sendToLegal |
| 8 | sendToSales | Sales | Routing | Send to Other Reviewer | Choose Other Reviewer | | Success | sendToOtherReviewer |
| 9 | sendToSales | Sales | Routing | Send to customer | Customer Review | | Success | sendToSales |
| 10 | sendToSales | Sales | Routing | Send for Signature | Add Document | | Success | sendForSignatures |
| 11 | sendToSales | Sales | Routing | Void document | Signatures | | Success | exception |
| 12 | sendForSignatures | Sales | | | Signatures | | Success | sendToFulfillment |
| 13 | sendForSignatures | Sales | | | Signatures | | Failure | sendToSales |
| 14 | sendForSignatures | Sales | | | Update Metadata | Requires Update | Failure | sendToLegal |
| 15 | sendToLegal | LegalQueue | Routing | Rejected | | Requires Legal Advice | | sendToSales |
| 16 | sendToLegal | LegalQueue | Routing | Approved | | | Success | sendToSales |
| 17 | sendToLegal | LegalQueue | Routing | Send to Commercial | | | | sendToCommercial |
| 18 | sendToCommercial | Commercial | Routing | Rejected | | | | sendToSales |
| 19 | sendToCommercial | Commercial | Routing | Approved | Update Metadata | | Success | sendToSales |
| 20 | sendToCommercial | Commercial | Routing | Send to Legal | | | | sendToLegal |
| 21 | sendToFulfillment | LegalQueue | Review | Approved | Update Metadata | | Success | complete |
| 22 | sendToOtherReviewer | Other | Routing | Approved | | | | sendToSales |
| 23 | sendToOtherReviewer | Other | Routing | Rejected | | | | sendToSales |
| 24 | exception | Administrator | Complete Form | Admin Rescue | Custom Rescue Actions | * | * | Re-entry Label |

FIG. 7

Exception Handler Form

Link to workflow monitor (opens in new browser tab)

Variables to patch

Variable Name: reEntryLabel

New Value:
sendToSales

Variable Name: docGenData

New Value:
```
<Params>
  <CustomerName>ACME Ltd.</CustomerName>
  <ContractType>CA</ContractType>
  <ContractValue>50000</ContractValue>
</Params>
```

Variable Name: submittedBy

New Value:
johndoe@example.com

[Add another variable patch]

[Done] [Cancel]

FIG. 9

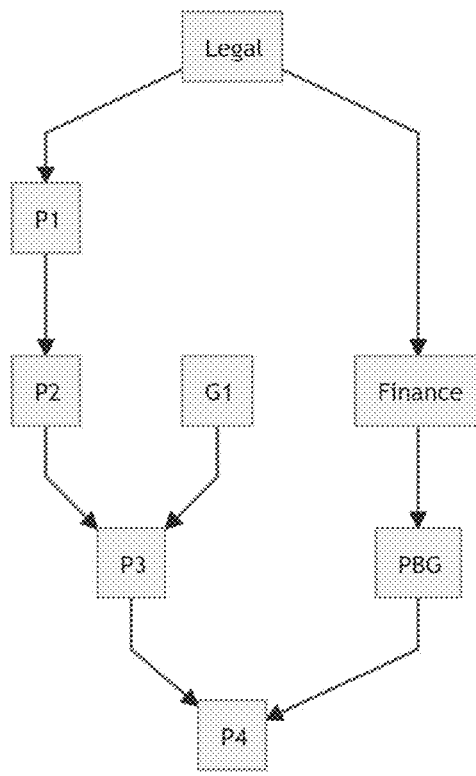

FIG. 10

| Approval | Approver | Approval Dependencies | Conditional | Terminal | Human Selectable |
|---|---|---|---|---|---|
| P1 | james@example.com | Legal | | TRUE | TRUE |
| P2 | pat@example.com | P1 | | TRUE | TRUE |
| P3 | janet@example.com | P2, G1 | value>50000 | TRUE | TRUE |
| P4 | jane@example.com | PBG, P3 | value>500000 | TRUE | TRUE |
| Legal | Queue_Legal | | | FALSE | FALSE |
| Finance | Group_Finance | Legal | | FALSE | FALSE |
| PBG | patty@example.com | Finance | | TRUE | TRUE |
| G1 | paul@example.com | | | TRUE | TRUE |

FIG. 11

AUTOMATING COMPLEX PROCESSES

BACKGROUND

The present technology relates to the automation of processes which may be complex or frequently changed. It is particularly applicable to complex advanced engineering where components may need to go through a number of operations which are independent and where judgement or human intervention is required so that the process is not linear and may vary from one execution to the next. An issue with automating real-world processes is that whilst the mere automation may be straightforward, it may be a difficult process to identify all the workflows before automation or coding can begin and be handed over to programmers. Moreover, problems frequently arise and debugging is complex as the programmers are divorced from the original process. It is well known for IT implementation projects to over-run and last for years.

Although the present technology deals with the issue of coding and automating manufacturing or the like processes, it has been appreciated that similar logic applies when the entity being worked on is not a physical component but intangible. Examples include a document which may need input from various departments within an organisation or a creative project or a software development project.

The conventional approach to process automation is depicted in FIG. 1. In a first step, business or process analysts observe the process to be automated. They document it. This is then turned into flow diagrams and requirements documents. This specification is then handed to programmers to implement. This is seemingly straightforward at this level of abstraction and is the established practice but has a number of issues in real world complex situations.

Firstly, the documentation of the process may be a major task taking several months or even years and the programmers cannot begin until this is complete, often leading to long delays before any benefits of automation can be seen. Secondly in complex processes, the initial process is rarely complete and accurate or even if it is the process may change and this requires going around the whole cycle again. Thirdly, both the initial process and the coding process may introduce errors and if an automated process fails it may be complex to debug. Fourthly the programmers are many steps removed from the process and it is problematic to relate issues in coding to the process and correct.

Currently, tools exist for developing a visual representation of a planned workflow which is planned to be implemented within a particular business. One such tool is DocuSign's Contract Lifecycle Management (CLM) (these are trademarks of DocuSign Inc of San Francisco, Calif.). Such a tool has pre-built functionality for allowing development of workflow implementations using a visual interface where each of the various actions, for each of the possible actors (sales, legal, etc) and the sequence of steps (flowcharts) are visually displayed, for each of the possible paths through the workflow for the complex process. The software code for carrying out the steps/actions is also embedded within the tool.

One problem with such currently available tools is that the visual representation in the user interface can soon become very complex and difficult for the human user to follow, given the large number of paths, actions, actors and outcomes that must be developed by the user in creating the automated workflow, and each of which are fully displayed on the user interface. Getting a good overall picture of such a workflow is therefore made quite difficult, and the creation of the workflow in the first place is quite a difficult endeavor given that the visualization language has to be used in the existing tool to create new steps for every individual actor to do each task.

SUMMARY

According to an aspect, the present technology provides a method of automating a process to process an object and/or perform a task comprising:

identifying a higher level workflow related to the process and encoding the higher level workflow in a higher level workflow program document, which higher level workflow program document is both machine interpretable and presented and editable in human-intelligible form, the higher level workflow program document identifying:

a set of actors who perform actions and/or make decisions, wherein the set of actors comprises one or more human operators, units within an organisation, machine-implemented tasks or a combination thereof, and wherein the actors are identified by human-intelligible labels;

a sequence of action steps, each action step having an associated actor and one or more expected outcomes, wherein the action steps are identified by human-intelligible labels and comprises taking a decision and/or progressing processing of an object or task, wherein the action steps optionally include complex action steps definable by a lower level workflow;

an identifier of a next step for each expected outcome, wherein a next step may include raising an exception;

optionally identifying at least one lower level workflow related to an element of a process and encoding the or each lower level workflow in a lower level workflow program document, which lower level workflow program document is both machine interpretable and presented and editable in human-intelligible form, the or each lower level workflow program document identifying:

optionally, additional actors not identified in other workflow program documents who perform actions and/or make decisions, wherein the set of actors comprises one or more human operators, units within an organisation, machine-implemented tasks, or a combination thereof, and wherein the additional actors are identified by human-intelligible labels;

a sequence of action steps, each action step having an associated actor and one or more expected outcomes, wherein the action steps are identified by human-intelligible labels and comprises taking a decision and/or progressing processing of an object or task, and wherein the action steps optionally include complex action steps definable by another lower level workflow;

an identifier of a next step for each expected outcome, wherein a next step may include raising an exception;

wherein the action steps may include action steps of a first type defined in the higher level workflow document or one of the lower level workflow program documents and action steps of a second type comprising program operation steps to be performed by programming defined outside the workflow program documents;

executing the process by running the workflow program documents using a computer runtime program to interpret the sequence of steps, wherein a change to the workflow program documents result in a change to the operation of the computer runtime program, and wherein the computer runtime program is arranged to report an exception in the runtime operation of the workflow to a supervisory function, which supervisory function has an interface enabling action to be taken including one of:

ad hoc handling of the exception by one-off reassignment or adjustment of the task or object being processed which resulted in the exception and re-inserting the task or object into an existing workflow;

augmenting or modifying one or more workflow program documents whereby subsequent tasks or objects will be handled according to the modified workflow program documents.

With this arrangement, a process can be simply "coded" in a human readable form without requiring specialist programming skill and the process is executed directly according to the human readable document. Whilst there may be some initial analysis, planning and implementation can be performed much more quickly by documenting the process incrementally in a sequence of steps in the workflow program documents which are directly usable. The applicants have found that projects which conventionally might have taken perhaps six months before any automation can literally have portions of the process running in automated form within a matter of weeks and moreover the outcome is effectively a debugged automation that is also readily adaptable to process changes and improvement without needing highly specialist input. The runtime program will typically interpret the document in real time but it may compile it into another form and re-compile it in the event of any change, which has a similar effect.

Going directly against the established wisdom, it is thus possible to start to automate a process without having considered all the various routes through the process and even in the knowledge or expectation that the process coding is incomplete or may have errors or undefined or incompletely defined elements or exceptional cases which are not catered for.

Having the process flow in human-intelligible form (by which is preferably meant that labels correspond to known entities or individuals or within an organisation, like fabrication, machining, paintshop or sales or legal) means that a non-programmer can readily understand and edit the workflows and directly "re-program" the system on the fly, which is something that the longstanding prejudice in the art genuinely strives hard to avoid.

In the event during execution a task fails to complete and an exception is flagged the supervisory function can take a human intervention to deal with the individual case and/or can decide to modify the workflow to handle such events in future without causing an exception or perhaps partially modify the process. This approach goes fundamentally against the general principle of operation of almost all IT systems in common use on the planet today by giving non-specialists the ability to reprogram or patch a potentially highly complex enterprise-level workflow "on the fly" without the usual processes and safeguards. This is in part made possible because of the novel architecture where if the modified workflow causes problems or unintended consequences, the other systems and building blocks are unaffected and should keep running and any new exceptions will be handed back to the supervisory function.

This arrangement copes with both evolution of systems and progressive implementation while allowing a computer program to run the automation from an early stage. For example, in initial deployment some action steps may not (yet) have been defined at all or fully and may simply comprise sending a message to the relevant human element of the organisation with the relevant information to complete the step in a process which is not (yet) fully documented. This may change over time into a development of a lower level workflow corresponding to a more structured execution of the task and/or to a coding requirement to automate some or all of the task. Moreover, if a process is modified the changes in the high level workflow program document can be made without having to re-run the whole implementation process. The ability to start safely running a computer automation of a real-world process in a live deployment without requiring simulation or beta testing before the automation process is complete or may have known problems is revolutionary.

In some embodiments, the method may further comprise notifying an operator upon raising an exception or upon detection of an error while the workflow program documents are running.

In some embodiments, the sequence of action steps may comprise determining a state of an object or task to determine a next step.

In some embodiments, determining a state of an object or task may comprise determining that a component part for the object is received, determining that the object has been assembled, determining that the object has passed quality check, determining that a document has been generated, determining that a document has been reviewed.

In some embodiments, the next action step may comprise passing the object to assembly, passing the object to quality assurance, passing the object to completion, sending a document to a predetermined actor for review, or sending a document to a predetermined actor for completion.

In some embodiments, the determining a state of an object or task may be performed by a human operator, a software function and/or at least in part by an AI module.

In some embodiments, the set of actors may comprise one or more of machine processes, fabrication, machining, finishing, surface treatment, electronics, assembly, machining quality control, or a combination thereof.

In some embodiments, the sequence of action steps may comprise one or more of cut blank, polish, surface treat, check tolerances, install PCB, test sensors, or a combination thereof.

In some embodiments, the set of actors may comprise one or more of sales, document preparation, legal, procurement, fulfilment, or a combination thereof.

In some embodiments, the sequence of action steps may comprise one or more of generate pricing, check compliance, check lead times, send to customer, or a combination thereof.

In some embodiments, the workflow program document may be arranged in tabular form in a table. In an embodiment, the method may further comprise:

defining the sequence of action steps by a series of rows in the table; and identifying, for each row:

an actor from the set of actors in a first column;

an action step from the sequence of action steps in a second column, the actor identified in the first column being associated with the action step;

an expected outcome associated with the action step in a third column; and an identifier of a next step for the expected outcome identified in the third column in a fourth column.

In some embodiments, one or more rows of the table may each comprise a plurality of action steps.

In some embodiments, action steps defined in the lower level workflow program document may comprise a constrained action step corresponding to a single action defined in the lower level workflow program document, or an unconstrained action step corresponding to a series of operation steps defined in a separate program document outside the workflow program documents, or a combination thereof.

In some embodiments, the method may further comprise assigning an authority level for each actor indicating an extent to which the actor is authorised to edit the higher level and/or lower level workflow program document.

In some embodiments, the object or task to be processed may be defined in an object or task definition document outside the workflow program documents, wherein the object or task definition document defines a set of parameters and/or attributes associated with the object or task.

In some embodiments, the associated set of parameters and/or attributes may be defined in a high-level computing language and editable only by a predetermined actor or group of actors.

In some embodiments, the higher level workflow program document may further identify a predetermined communication format associated with each series of action steps, wherein when the identifier of a next step for an expected outcome of a first sequence of action steps associated with a first actor identifies a second sequence of action steps associated with a second different actor, the method may further comprise notifying the second actor in the predetermined communication format to perform the second sequence of action steps.

In some embodiments, each human-intelligible label identifying an actor or an action step may comprise words, symbols and/or numbers carrying their common everyday meaning and comprehensible by a human operator.

In some embodiments, the method may further comprise identifying, by a label parser, an inconsistency in the human-intelligible labels.

In some embodiments, the method may further comprise the label parser providing a suggestion for an inconsistent label.

In some embodiments, the method may further comprise, upon raising an exception, generating a report identifying one or more issues that caused the exception.

In some embodiments, the method may further comprise providing in the report a plurality of options for resolving the exception, the plurality of options may comprise one or more of modifying a higher level workflow program document, modifying a lower level workflow program document, modifying a frequently-used workflow program document, including a new lower level workflow in a lower level workflow program document, manually bypassing a workflow or an action step, or manually adjusting a workflow or an action step.

In some embodiments, the method may further comprise assigning a priority to each of the plurality of options for resolving the exception.

In some embodiments, the plurality of options may be selectable, the method may further comprise, upon an option being selected, presenting a part of the workflow program document on an interface when the one or more issues that caused the exception relates to the part of a workflow program document.

In some embodiments, the method may further comprise generating one or more editable patch comprising one or more element of a workflow program document corresponding to the identified one or more issues that caused the exception.

In some embodiments, the method may further comprise implementing a machine learning algorithm for monitoring the running of the workflow program documents so as to generate the plurality of options and/or the one or more editable patch.

In some embodiments, the method may further comprise, upon raising an exception in relation to a first sequence of action steps, notifying a first actor associated with the first sequence of action steps, or a predetermined human operator assigned to the first sequence of action steps, or a predetermined AI module, or a combination thereof.

In some embodiments, the method may further comprise providing for selection a plurality of editable workflow program document elements for compiling a final workflow program document.

In some embodiments, the method may further comprise providing a recommendation for an editable workflow program document element for compiling the final workflow program document.

In some embodiments, the lower level workflow program document may comprise a plurality of tiers of lower level workflows.

In some embodiments, the method may further comprise assigning each lower level workflow in the lower level workflow program document to a tier based on a frequency of use thereof.

In another broad aspect the present technology provides a method of automating a process to process a task or an object comprising:

defining elements of the process in one or more human-intelligible and editable and machine interpretable workflow program documents, the workflow program documents each including a plurality of actors who perform actions or take decision, a sequence of action steps each associated with an actor and having at least one expected outcome and a corresponding next step for each expected outcome, and wherein the action steps may include a first type of action further defined within the workflow program documents and a second type of action implemented by a computer according to code defined other than in said workflow program documents;

executing the process by a processor running the code defined by the workflow program documents, wherein if an exception is detected in the processing of a task or object according to the code, the exception is passed to a supervisory function to perform a remedial action, wherein the available remedial actions include individually modifying the task or object to be processed or on the fly patching or modifying of the workflow program documents, wherein the modified workflow program documents are interpreted or re-compiled whereby the processor subsequently executes a modified process according to the modified document.

Further features and elements and preferred and optional features of one aspect of the present technology may be applied to one or more other aspects. Indeed, it will be apparent throughout this specification that the various aspects are closely intertwined and to avoid repetition features described in respect of any aspect or element are to be considered generally applicable to other aspects unless otherwise stated or clearly limited to that aspect.

It is particularly advantageous if the workflow program documents are recorded in a tabular form with columns corresponding respectively to actors, actions, possible outcomes and next steps. This is found to be an easy arrangement both for coding purposes to enable generation and modification of code, human intelligibility and machine interpretation.

In a related aspect, the present technology provides a method of encoding a program defining a workflow for implementing a process, the method comprising:
- defining a sequence of actions by a series of first rows in a table; and
- for each row identifying:
  1. an actor from a set of actors associated with an action in a first column;
  2. an action step in a second column;
  3. an expected outcomes in a third column;
  4. a next step in a fourth column.

In a complimentary aspect the present technology provides a computer program or computer program product comprising information arranged for tabular representation comprising a sequence of rows corresponding to a sequence of actions to perform the process, each row containing information identifying:
1. an actor from a set of actors associated with an action in a first column;
2. an action step in a second column;
3. a series of expected outcomes in a third column;
4. a next step in a fourth column.

In a further aspect the present technology provides a computer implemented method of executing a process comprising parsing a workflow program document to read a sequence of actions from a sequence of rows, wherein an identifier of actor associated with each action is read from a first column, an identifier of an action to be executed is read from a second column, expected outcomes are identified in a third column and a next step for each expected outcome is identified from a fourth column.

By using a tabular form the user need not learn any particular scripting language and errors are reduced yet the program remains readily executable by a machine.

The tabular form may be stored conveniently in a CSV file or Excel spreadsheet and manipulated using existing tools (with Copy and Paste) for editing and working with such tables to generate workflow programs in an environment a non-specialist programmer user may be familiar with.

In some embodiments, the method may further comprise, for each first row, identifying in a fifth column one or more dependency conditions for a corresponding action step identified in the second column, wherein execution of the corresponding action step is conditional on the dependency condition being satisfied.

In some embodiments, the method may further comprise defining a further action in a second row, wherein execution of the second row results in the dependency condition being satisfied.

In some embodiments, the table may be stored in a CSV file or a spreadsheet.

In some embodiments, one or more first rows may each comprises a plurality of action steps.

In some embodiments, an action step may comprise determining a state of an object of the process to determine a next step.

In some embodiments, determining a state of the object may comprise determining that a component part for the object is received, determining that the object has been assembled, determining that the object has passed quality check, determining that an object document has been generated, determining that an object document has been reviewed.

In some embodiments, the next step may comprise passing the object to assembly, passing the object to quality assurance, passing the object to completion, sending the object document to a predetermined actor for review, or sending the object document to a predetermined actor for completion.

In some embodiments, an actor may comprise one or more of machine processes, fabrication, machining, finishing, surface treatment, electronics, assembly, machining quality control, or a combination thereof.

In some embodiments, an action step may comprise one or more of cut blank, polish, surface treat, check tolerances, install PCB, test sensors, or a combination thereof.

In some embodiments, an actor may comprise one or more of sales, document preparation, legal, procurement, fulfilment, or a combination thereof.

In some embodiments, an action step may comprise one or more of generate pricing, check compliance, check lead times, send to customer, or a combination thereof.

In some embodiments, an action step may comprise at least one constrained action step corresponding to a single action defined within the program.

In some embodiments, an action step may comprise at least one unconstrained action step corresponding to a series of operation steps defined in a separate program document outside the program.

In some embodiments, the method may further comprise assigning an authority level for each actor indicating an extent to which the actor is authorised to edit the program.

In some embodiments, an object of the process may be defined in an object definition document separate from the program, wherein the object definition document defines a set of parameters and/or attributes associated with the object.

In some embodiments, the associated set of parameters and/or attributes may be defined in a high-level computing language and editable only by a predetermined actor or group of actors.

In some embodiments, each row of the table may be identified by a human-intelligible label, each human-intelligible label comprises words, symbols and/or numbers carrying their common everyday meaning and comprehensible by a human operator.

In some embodiments, the method may further comprise identifying, by a label parser, an inconsistency in the human-intelligible labels, and providing a suggestion to resolve the inconsistency.

In some embodiments, the method may further comprise defining an exception path in a third row, the third row being identifiable as a next step of a first row in the table when the expected outcome of first rows meets a predetermined condition.

In some embodiments, execution of the exception path may generate a report identifying the predetermined condition.

In some embodiments, the method may further comprise providing in the report a plurality of options for resolving the predetermined condition, the plurality of options comprising one or more of modifying a first row, modifying one or more of the first, second, third or fourth columns of a first row, defining a new row, manually bypassing a first row, or manually adjusting a first row.

In some embodiments, the method may further comprise assigning a priority to each of the plurality of options for resolving the predetermined condition.

In some embodiments, the method may further comprise generating one or more editable patch comprising one or more element of the first row with the undesirable outcome.

In some embodiments, the method may further comprise implementing a machine learning algorithm for monitoring the running of the program so as to generate the plurality of options and/or the one or more editable patch.

In some embodiments, execution of the exception path may generate a notification to a predetermined actor associated with the first row with the predetermined condition and/or a predetermined AI module.

In some embodiments, the method may further comprise providing an interface for receiving inputs from an operator, wherein the inputs comprise selecting a section of the table, copying and pasting a section of the table, dragging and dropping a section of the table, and/or modifying a section of the table.

Another aspect of the present technology provides a method of automating a process to process a task or an object comprising:
- defining elements of the process in one or more human-intelligible and editable and machine interpretable workflow program documents, the workflow program documents each including a plurality of actors who perform actions or take decision, a sequence of action steps each associated with an actor and having at least one expected outcome and a corresponding next step for each expected outcome and wherein the action steps are recorded in sequential form and have an option to include one or more dependencies on other actions or actors;
- executing the process by a processor running the code defined by the workflow program documents wherein in executing the sequential actions, optional dependencies are evaluated and action steps are deferred notwithstanding their sequence in the documents if dependencies are not satisfied.

Thus, complex processes which involve multiple elements or actors can be simply and efficiently coded, executed and edited without complex branching or conditional programming which may be difficult to amend. For example, suppose a component must be evaluated by electronics software basic testing prior to calibration and the process may have many possible pathways with possible iteration depending on the precise nature and origin of a component so that basic software testing can be performed at different points for different components. Instead of having to encode a complex workflow for each eventuality, the calibration can simply be encoded as a sequential action after the various earlier processing steps that are generally applied but made dependent on software basic testing. Then, whatever the pathway through the earlier steps, it will not proceed to calibration until the software basic testing is complete, whichever order or however many iterations the earlier steps take. As noted elsewhere the process can be used for intangible objects such as documents as well as manufactured tangible objects and for example a legal approval may be a dependency condition.

Preferably, if exceptions are detected in the processing of a task or object according to the code an exception is passed to a supervisory function to perform a remedial action wherein the available remedial actions include individually modifying the task or object to be processed or on the fly patching or modifying of the workflow program documents, wherein the modified workflow program documents are interpreted or re-compiled whereby the processor subsequently executes a modified process according to the modified document.

The method may include defining a sequence of steps including at least one action step which is dependent on the outcome of another step performed by a different actor and recording a dependency condition and separately defining an action step to be performed by the different actor which, if executed successfully, will satisfy the dependency condition.

In some embodiments, the method may further comprise defining a first sequence of action steps performed by a first actor, wherein execution of at least one action step of the first sequence is dependent on the outcome of an action step of a second sequence of action steps performed by a second actor, and recording a dependency condition with the first sequence of action steps.

In some embodiments, upon the action step of the second sequence being executed successfully, the dependency condition of the first sequence is satisfied and the at least one action step of the first sequence may be executed.

In some embodiments, an action step may comprise determining a state of an object of the process to determine a next step.

In some embodiments, determining a state of the object may comprise determining that a component part for the object is received, determining that the object has been assembled, determining that the object has passed quality check, determining that an object document has been generated, determining that an object document has been reviewed.

In some embodiments, the next step may comprise passing the object to assembly, passing the object to quality assurance, passing the object to completion, sending the object document to a predetermined actor for review, or sending the object document to a predetermined actor for completion.

In some embodiments, an actor may comprise one or more of machine processes, fabrication, machining, finishing, surface treatment, electronics, assembly, machining quality control, or a combination thereof.

In some embodiments, an action step may comprise one or more of cut blank, polish, surface treat, check tolerances, install PCB, test sensors, or a combination thereof.

In some embodiments, an actor may comprise one or more of sales, document preparation, legal, procurement, fulfilment, or a combination thereof.

In some embodiments, an action step may comprise one or more of generate pricing, check compliance, check lead times, send to customer, or a combination thereof.

In some embodiments, an action step may comprise at least one constrained action step corresponding to a single action defined in the workflow program document.

In some embodiments, an action step may comprise at least one unconstrained action step corresponding to a series of operation steps defined in a separate program document outside the workflow program documents.

In some embodiments, an object of the process may be defined in an object definition document separate from the workflow program documents, wherein the object definition document defines a set of parameters and/or attributes associated with the object.

In some embodiments, the associated set of parameters and/or attributes may be defined in a high-level computing language and editable only by a predetermined actor or group of actors.

In some embodiments, each sequence of action steps may be identified by a human-intelligible label, each human-intelligible label comprises words, symbols and/or numbers carrying their common everyday meaning and comprehensible by a human operator.

In some embodiments, the method may further comprise identifying, by a label parser, an inconsistency in the human-intelligible labels, and providing a suggestion to resolve the inconsistency.

In some embodiments, the method may further comprise defining an exception sequence, wherein when the at least one expected outcome of a sequence of action steps is an undesirable outcome, the corresponding next step for the undesirable outcome routes to the exception sequence.

In some embodiments, execution of the exception sequence may generate a report identifying the undesirable outcome.

In some embodiments, the method may further comprise providing in the report a plurality of options for resolving the undesirable outcome, the plurality of options may comprise one or more of modifying the task or object to be processed, applying a patch to a workflow program document while the code is running, modifying a workflow program document to be re-compiled whereby the processor subsequently executes the code with the modified workflow program document.

In some embodiments, the method may further comprise assigning a priority to each of the plurality of options for resolving the undesirable outcome.

In some embodiments, the method may further comprise generating one or more editable patch comprising one or more element of the first row with the undesirable outcome.

In some embodiments, the method may further comprise implementing a machine learning algorithm for monitoring the running of the program so as to generate the plurality of options and/or the one or more editable patch.

A further aspect of the present technology provides a method of automating a process to process a task or an object comprising:
  defining elements of the process in one or more human-intelligible and editable and machine interpretable workflow program documents, the workflow program documents each including a plurality of actors who perform actions or take decision, a sequence of action steps each associated with an actor and having at least one expected outcome and a corresponding next step for each expected outcome and wherein the action steps are recorded in sequential form and have an option to include one or more dependencies on other actions or actors;
  recording in one or more separately editable human-intelligible and machine interpretable object or task definition documents definitions of tasks or objects referenced in the workflow program documents by human-intelligible labels wherein the object or task definition documents include parameters and attributes for each task or object;
  executing the process by a processor running the code defined by the workflow program documents wherein in executing the sequential actions, tasks or objects are handled with reference to human-intelligible labels and wherein the workflow program documents are editable by a first interface by a first user during execution of the process and/or in response to an exception occurring in the workflow and wherein the object or task definition documents are editable by a second interface by a second user independent of the execution of the workflow program documents.

In this way a first user who is familiar with the overall process workflow but need not be conversant with the full details of each task or object being operated on can define and edit or manage exceptions in the overall workflow. A second user who may be familiar with the details of some objects or tasks but need not know the full details of the overall workflow can edit the object definitions. For example, if it is found that an additional variable may be helpful to track a particular component it can be added without needing to re-encode the overall workflow.

A further aspect of the present technology provides a program document encoding a process comprising:
  one or more workflow program documents, each workflow program document defining elements of the process and each workflow program document defining a plurality of actors who perform actions or take decision, a sequence of action steps each associated with an actor and having at least one expected outcome and a corresponding next step for each expected outcome and wherein the action steps are recorded in sequential form and have an option to include one or more dependencies on other actions or actors; and
  one or more object or task definition documents recording definitions of tasks or objects referenced in the one or more workflow program documents by a corresponding human-intelligible label, wherein the one or more object or task definition documents include parameters and attributes for each task or object.

Another aspect provides a method of executing the above program document comprising running, by a processor, the code defined by the one or more workflow program documents, wherein the sequential actions, tasks or objects are handled with reference to human-intelligible labels, and wherein the one or more workflow program documents are editable by a first interface by a first user during execution of the program document and/or in response to an exception occurring in the workflow, and wherein the object or task definition documents are editable by a second interface by a second user independent of the execution of the workflow program documents.

In some embodiments, the method may further comprise defining a first sequence of action steps performed by a first actor, wherein execution of at least one action step of the first sequence is dependent on the outcome of an action step of a second sequence of action steps performed by a second actor, and recording a dependency condition with the first sequence of action steps.

In some embodiments, upon the action step of the second sequence being executed successfully, the dependency condition of the first sequence is satisfied and the at least one action step of the first sequence may be executed.

In some embodiments, an action step may comprise determining a state of an object of the process to determine a next step.

In some embodiments, determining a state of the object may comprise determining that a component part for the object is received, determining that the object has been assembled, determining that the object has passed quality check, determining that an object document has been generated, determining that an object document has been reviewed.

In some embodiments, the next step may comprise passing the object to assembly, passing the object to quality assurance, passing the object to completion, sending the object document to a predetermined actor for review, or sending the object document to a predetermined actor for completion.

In some embodiments, an actor may comprise one or more of machine processes, fabrication, machining, finishing, surface treatment, electronics, assembly, machining quality control, or a combination thereof.

In some embodiments, an action step may comprise one or more of cut blank, polish, surface treat, check tolerances, install PCB, test sensors, or a combination thereof.

In some embodiments, an actor may comprise one or more of sales, document preparation, legal, procurement, fulfilment, or a combination thereof.

In some embodiments, an action step may comprise one or more of generate pricing, check compliance, check lead times, send to customer, or a combination thereof.

In some embodiments, an action step may comprise at least one constrained action step corresponding to a single action defined in the workflow program documents.

In some embodiments, an action step may comprise at least one unconstrained action step corresponding to a series of operation steps defined in a separate program document outside the workflow program documents.

In some embodiments, an object of the process may be defined in an object definition document separate from the program, wherein the object definition document defines a set of parameters and/or attributes associated with the object.

In some embodiments, the associated set of parameters and/or attributes may be defined in a high-level computing language and editable only by a predetermined actor or group of actors.

In some embodiments, each sequence of action steps may be identified by a human-intelligible label, each human-intelligible label comprises words, symbols and/or numbers carrying their common everyday meaning and comprehensible by a human operator.

In some embodiments, the method may further comprise identifying, by a label parser, an inconsistency in the human-intelligible labels, and providing a suggestion to resolve the inconsistency.

In some embodiments, the method may further comprise defining an exception sequence, wherein when the at least one expected outcome of a sequence of action steps is a predetermined undesirable outcome, the corresponding next step for the predetermined undesirable outcome identifies the exception sequence.

In some embodiments, execution of the exception sequence may generate a report identifying the predetermined undesirable outcome.

In some embodiments, the method may further comprise providing in the report a plurality of options for resolving the predetermined undesirable outcome, the plurality of options comprising one or more of modifying the task or object to be processed, applying a patch to a workflow program document while the code is running, modifying a workflow program document to be re-compiled whereby the processor subsequently executes the code with the modified workflow program document.

In some embodiments, the method may further comprise assigning a priority to each of the plurality of options for resolving the predetermined undesirable outcome.

In some embodiments, the method may further comprise generating one or more editable patch comprising one or more element of the first row with the predetermined undesirable outcome.

In some embodiments, the method may further comprise implementing a machine learning algorithm for monitoring the running of the program so as to generate the plurality of options and/or the one or more editable patch.

The method provides for the development and use of a new tool for the automation of a complex workflow, which does not suffer from the problems identified above with currently available visual representation language tools. Specifically, the resulting particular workflow that has just been created for a new process to be automated can be represented simply in the workflow program document, due to the combination of the existing visual representation tool with the new workflow program document and the new associated linear programming used to process the workflow program document.

BRIEF DESCRIPTION OF THE DRAWINGS

The embodiments will be described, by non-limiting example only, with reference to the following drawings:

FIG. 3A shows the left half of an exemplary workflow program document of a manufacturing process according to an embodiment;

FIG. 3B shows the right half of the exemplary workflow program document of FIG. 3A according to an embodiment;

FIG. 5 shows an example of workflow routing to completion based on the workflow program document of FIGS. 3A and 3B;

FIG. 6A shows the left half of an exemplary workflow program document of a document signing process according to an embodiment;

FIG. 6B shows the right half of the exemplary workflow program document of FIG. 6A according to an embodiment;

FIG. 7 shows an example of workflow routing to completion based on the workflow program document of FIGS. 6A and 6B;

FIG. 9 shows an exemplary exception handling interface according to an embodiment;

FIG. 10 shows an exemplary complex approval process;

FIG. 11 shows an exemplary workflow program document for the complex approval process of FIG. 10 according to an embodiment;

DETAILED DESCRIPTION

Figure 1:
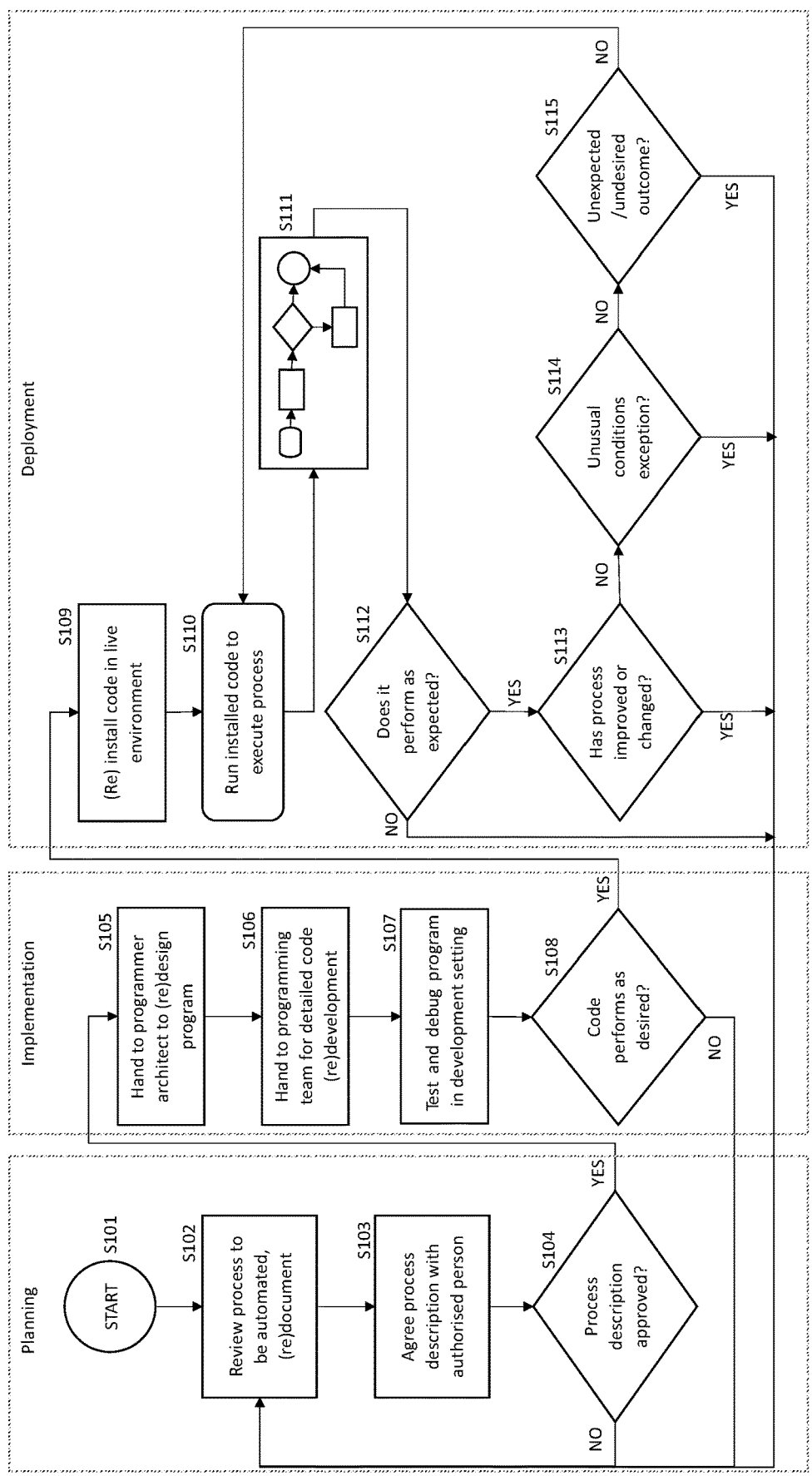
FIG. 1 shows an exemplary conventional method of automating complex processes.

The examples and conditional language recited herein are intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its scope as defined by the appended claims.

Furthermore, as an aid to understanding, the following description may describe relatively simplified implementations of the present technology. As persons skilled in the art would understand, various implementations of the present technology may be of a greater complexity.

In some cases, what are believed to be helpful examples of modifications to the present technology may also be set forth. This is done merely as an aid to understanding, and, again, not to limit the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry embodying the principles of the present technology. Similarly, it will be appreciated that any flowcharts, flow diagrams, state transition diagrams, pseudocode, and the like represent various processes which may be substantially represented in computer-readable media and so executed by a computer or processor, whether or not such computer or processor is explicitly shown.

It will be clear to one skilled in the art that many improvements and modifications can be made to the foregoing exemplary embodiments without departing from the scope of the present technology.

Conventionally, automation of a complex process begins with a planning stage in which all possible actions involved in the process and all possible ways of routing from to and from each action are identified and documented as one or more workflows. The workflows of the identified actions and corresponding routes is generally documented as a complex flow diagram with many branches, conditions, options and possible outcomes.

Once the documented workflows are approved by the relevant personnel, the complex flow diagram may then be programmed during an implementation stage, often by a contracted programmer outside of the organisation, in a labour-intensive and time-consuming iterative process. The workflow program is then tested, debugged, revised and re-tested until it is running as expected, and finally deployed at a deployment stage. If at any point during runtime, the workflow program encounters an error, the workflow program is sent back to the planning stage and the process is reviewed for possible changes, updates and corrections.

This conventional approach of automating a complex process, such as a precision manufacturing process for an article in a factory, is illustrated FIG. 1. The method begins at S101. At S102, components of the complex process are reviewed, for example by a supervisor of the process or each of a plurality of supervisors of each branch of the process, and documented. A component may for example be a workflow related to a given branch of the process, such as selection of a part in a manufacturing process. The document is reviewed at S103 by an authorised person, for example a manager, who approves (or rejects) the document at S104 and forwards it on for implementation.

At S105, the document is handed to a program designer to design a program for automating the documented process, then, generally, a programming team develops the detailed code at S106 based on the design. The program is tested and debugged at S107 to determine, at S108, whether the detailed code is performing as expected based on the document. After a number of testing and debugging cycles, if the program does not perform as desired, the document is sent back to S202 to be reviewed again and optionally redocumented. If the program performs as desired according to the documented process, the program is sent for deployment.

At S109, the program code is installed, e.g. on a computing system of the factory, and the installed code is run at S110 on the computing system to execute the process S111. At any stage during the execution of the process or when the execution of the process S111 is terminated, a supervisor or supervisory function may determine at S112 whether the program is performing as expected, e.g. the process has been executed to completion, or if the execution of the process has terminated with an error. If the execution of the process is not performing as expected, the program and the documented process are sent back to S102 for review and optionally redocumented. If the execution of the process is performing as expected, the supervisor or supervisory function may further determine at S113 whether there has been any changes in the process since the process was documented. If it is determined that there has been improvements or changes to the process, the documented process is sent back to S102 for review and redocumented. If it is determined that there has been no changes to the process, the supervisor or supervisory function may further determine at S114 if at any point during the execution of the process it has met any unexpected conditions or exceptions, for example whether a particular workflow is excluded. If it is determined that one or more unexpected conditions or exceptions have occurred, the documented process is sent back to S102 for review and optionally redocumented. If it is determined that there has been no unexpected conditions or exceptions, the supervisor or supervisory function may further determine at S115 if the execution of the process has returned any unexpected or undesired outcome, for example if the execution of the process has terminated before the manufacturing of the article is completed. If it is determined that the execution of the process has returned an unexpected or undesired outcome, the documented process is sent back to S102 for review and optionally redocumented. If it is determined that there has been no unexpected or undesired outcome, the method returns to S110 and the program code is again run, and the process is again executed.

As can be seen in FIG. 1, the conventional approach requires that the documented process and the program code be sent back to the planning stage whenever the programming or the execution of the program code encounters any errors or unexpected exceptions. Since the planning, implementation and deployment stages are decoupled from each other, any errors or unexpected exceptions may need to be independently identified by both a supervisor of the factory and the programming team, and then the code is updated or debugged by the programming team and tested before redeployment.

In view of the foregoing, the present technology provides a radically different approach in which the planning and implementation stages are combined and simplified, in that a workflow program document can be deployed even when it is only partially complete. This is facilitated by a new workflow program architecture that allows continuous editing and updating of the workflow program document while it is deployed. In other words, instead of the conventional approach of decoupling the planning, implementation and deployment stages, the present approach combines the planning and implementation stages, and the combined planning and implementation stages are overlapped with the deployment stage. The present approach is exemplified in FIG. 2.

Figure 2:
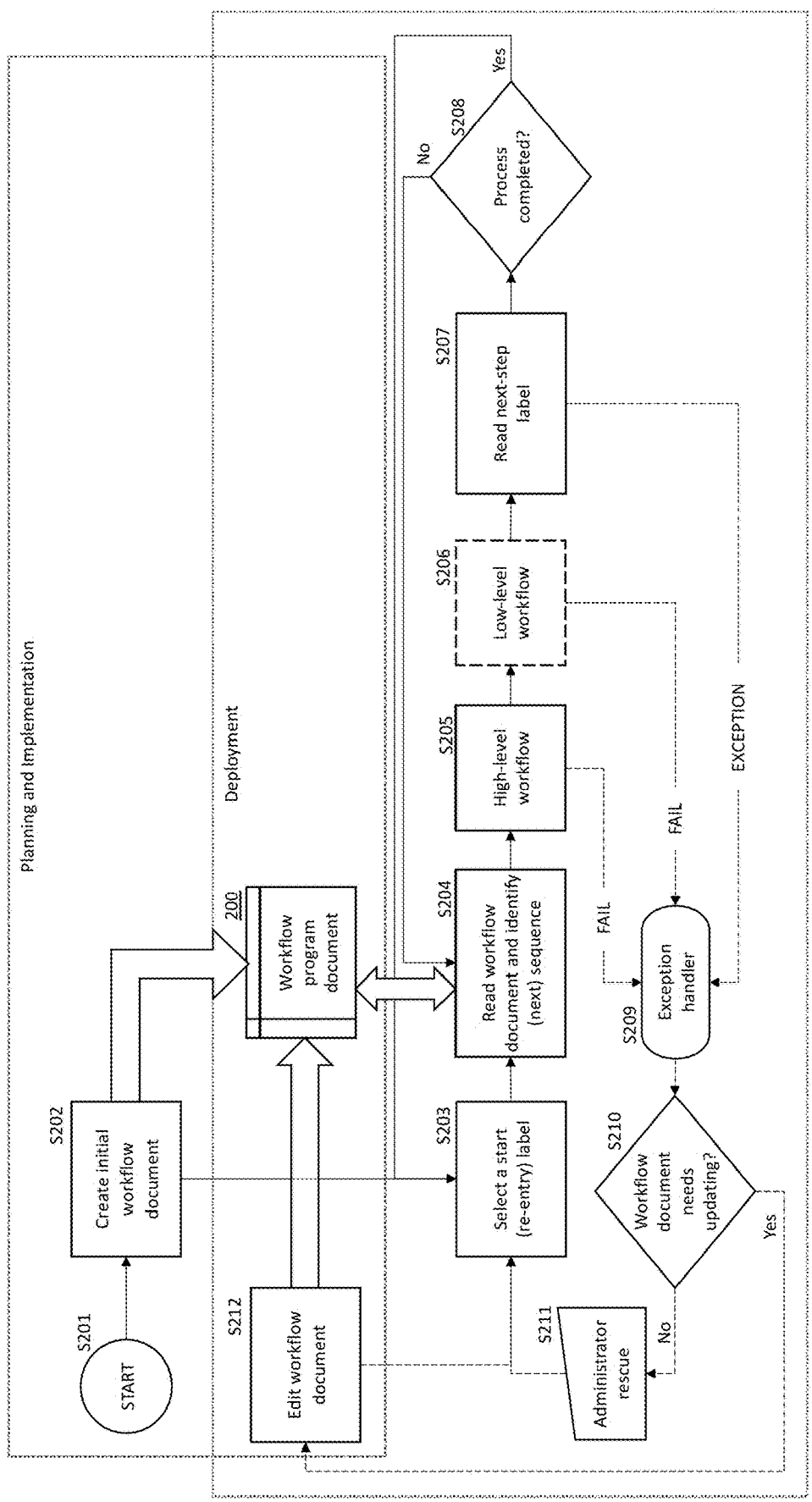
FIG. 2 shows an exemplary method of automating complex processes according to an embodiment.

FIG. 2 illustrates schematically a method of automating a complex process according to an embodiment. The method begins at S201 at the combined planning and implementation stage. At S202, an initial workflow program document 200 is created, which generally comprises a high (or top) level workflow with one or more optional low-level workflows, the high-level workflow and each optional low-level workflow is identified by a human-intelligible label and ends with a next-step label that identifies the label to be read next. The workflow program document may for example be stored in a tabular form, and it will be described in more detail below. Unlike the workflow program code from the example of FIG. 1, the initial workflow program document created at S202 does not need to be complete, in that the initial workflow program document only requires as minimum the high-level workflow before it can be executed. Once the workflow program document 200 is created, it can be deployed with minimal to no testing or debugging (although in practice it may be preferable to test the workflow program document 200 before deployment).

At the deployment stage, the method begins at S203 with the selection of a start label. For example, in a manufacturing process, a start label may be the selection of a component part. Once a start label is selected, the method proceeds to S204 when the workflow program document 200 is read to identify a sequence. Herein, a set of low-level workflows identified by the same label is referred to as a sequence. Once a sequence is identified by the start label, the high-level workflow is executed at S205, followed by a low-level workflow (if any) referenced in the high-level workflow at S206. The workflow ends with a next-step label that indicates the next step to be executed.

The next-step label is read at S207, and at S208 it is determined if the next-step label indicates that the process has completed. If it is determined that the process has completed at S208, the method returns to S203 and a start label is selected to begin the process again. If it is determined that the process has not completed at S208, the method returns to S204 and the workflow program document 200 is read again to identify the next sequence to be executed as identified by the next-step label.

The execution of a selected workflow may sometimes lead to an undesired outcome, for example a component part may fail a quality assurance check. In this case, the execution of this workflow ends with the next-step label "exception", which diverts the workflow to an exception handler S209 to resolve the undesired outcome. There may also be instances when an error occurs during the execution of the high-level workflow or a low-level workflow, causing the automated process to fail. When the process encounters an error, the workflow that is executing when the error occurs is diverted to the exception handler S209. The exception handler S209 determines how the exception is to be resolved, for example by requesting a manual input from a human operator, or by selecting an appropriate response from a number of responses stored on a database based on the nature of the exception e.g. with the aid of an AI agent. Exception handling will be described in more detail below. If it is determined that the workflow program document 200 requires editing or updating, for example due to a change in the process or a missing element in a workflow, the method proceeds to S212 where the workflow program document is edited, then the method can again proceed to S203 at which a re-entry label is selected to direct the execution of the process back to the workflow where the exception occurs. If it is determined that the exception cannot be resolved by editing or updating the workflow program document 200 at S210, the method proceeds to initiate an administrator rescue at S211. This may for example involve notifying an administrator that a manual input is required and seek such manual input, or it may involve a more detailed diagnostic performed wholly or partially by an AI agent. When an exception occurs, a human administrator or an AI agent can for example inspect workflow variables, in particular to look for mistakes made by the actor(s) associated with the workflow that encounters the exception. If an error is discovered the error can be corrected on the fly as the workflow program document is being executed. For example, an actor may have misinterpreted the meaning of a request for approval leading to a failed outcome, and the administrator may manually mark the request as approved. Once the exception is resolved, the method can proceed to S203 at which a re-entry label is selected to direct the execution of the process back to the workflow where the exception occurs.

As can be seen from the embodiment of FIG. 2, the workflow program document 200 may be deployed without all workflows in the process having been incorporated therein, and an error or undesired outcome encountered during runtime can be resolved by the exception handler "on the fly" while the workflow program document is being executed without the need to return the workflow program document to the planning and implementation stage, and the automated process can resume at the point where the error or undesired outcome was detected once it is resolved. Such overlapping of planning and implementing with the deployment of the automated process is facilitated by the architecture of the workflow program document, in that each group of workflows is identified by a label, and within the group or sequence each path corresponds to a different outcome that leads to a corresponding next step. The use of human-intelligible labelling of each sequence of workflow enables the workflow program document to be both machine-readable and human-intelligible, such that it can be equally easily managed and modified by anyone within the organisation (and not just a trained programmer). The segmentation of the different outcomes of different workflows enable each possible path to be uniquely identified in a uniform framework, enabling the workflow program document to be easily updated and expanded to include new low-level workflows.

It should be noted that the low-level workflows are optional, in that the workflow program document can run with a high-level workflow alone without any or a complete set of low-level workflows, though it is generally preferred to include at least one low-level workflow in the workflow program document. The workflow program document can be configured to contain a placeholder for a low-level workflow for instances where a low-level workflow does not yet exist. With this approach, it is possible to run the workflow program document without having a complete set of low-level workflow, and a low-level workflow may be inserted at the placeholder during runtime when needed.

According to present embodiments, the workflow program document may be encoded in a non-proprietary text format, allowing it to be edited without requiring any specialised tools. This enables the workflow program document to be portable between platforms (e.g. between different vendors) and allows non-specialist users to edit the document.

The lower level workflows may alternatively or additionally be coded using specialist tools to allow for a higher level of customisation while still allowing the higher (top) level workflow to remain easy to interpret by an operator.

It should be noted that the present approach is not specific to any particular industry, process or artefact and is universally applicable for automating any processes. The present approach is particularly advantageous for automating complex processes, in which changes to a given process are frequent and expectations for the automation to be completed in a short amount of time is high. Such challenges that are specific to complex processes can be addressed by the framework of the present approach due to its flexible nature, which allows early deployment by e.g. releasing a partially completed workflow program document. The dynamic nature of the framework enables changes to sequences and/or lower level workflows to be performed without disrupting the existing workflows in the workflow program document, thereby allowing a smoother release process. Moreover, as a result of the common usability of the present approach across a variety of processes and artefacts within an organisation (or across multiple organisations), it can lead to significant implementation cost savings at the initial stages of automation as well as a reduction in long-term maintenance.

Manufacturing Process

FIGS. 3A and 3B show an exemplary workflow program document for a manufacturing process according to an embodiment. FIG. 3A illustrates the left half of the exemplary workflow program document while FIG. 3B illustrates the right half of the exemplary workflow program document. The exemplary workflow program document is shown in two parts to increase legibility, but it can be written, stored and read as a single document or two (or more) separate documents.

The exemplary workflow program document includes a plurality of workflows, each workflow forming a sequence identified by a human-intelligible label (e.g. choosePart), and each sequence has an associated actor (e.g. Sales) that performs the workflow. Each sequence includes one or more paths each corresponding to a different outcome of the workflow (e.g. Success or Failure), and each outcome leads to a corresponding next step identified by a Next-Step Label. Each path comprises either a type 1 (constrained) action or a type 2 (unconstrained) action, or both, and each type of action comprises an action step and a corresponding output. Optionally, additional conditions that differentiate one path from another within a workflow may be defined in a separate column e.g. "Condition". Optionally, a set of communication parameters associated with a workflow for communication between actors may be defined in a separate column e.g. "Comms", where for example such communication parameters may be specified with a code that identifies each set of communication parameters (e.g. in the form of templatised communication content) in a separate lookup table. Optionally, additional information associated with a path may be defined in a separate column e.g. "Action Step 2 Options". Optionally, any dependencies that exist in a workflow may be defined in a separate column e.g. "Dependency".

In the present embodiment, a type 1 (constrained) action refers to an action step that requires a simple single-step action (referred to below as a "Simple Step") such as making a decision or routing to a different workflow. For example in the workflow "sendToQA" (lines 10 to 12) of the exemplary workflow program document, the action step "Approval" requires a simple single-step action of either approval or rejection. A type 2 (unconstrained) action refers to an action step that requires a more complex multi-step action and/or execution of a sub-routine (e.g. programming that is outside of the workflow program document)(referred to below as a "Complex Step"). In the same example workflow "sendToQA", the action step "Create Certificate of Quality" diverts the workflow to a sub-routine to create a certificate of quality.

In the present embodiment, the exemplary workflow program document is recorded in tabular form as a spreadsheet. A single line of the spreadsheet represents a path which describes a unique combination of high-level workflow, low-level workflow, as well as the inputs, outputs and conditions of these workflows. A sequence is a collection of paths having the same label. The combination of paths that defines a sequence may change depending on the evaluation of the condition.

As can be seen in the exemplary workflow program document, each workflow is identified with a machine-readable yet human-intelligible label that comprises texts, symbols or numbers that carry their normal everyday meaning, such that a workflow can be easily located, and more importantly any errors can be easily identified, by both a human operator and a software or AI tool. Preferably, each actor, action step, condition, option, dependency, output and/or outcome are also recorded using human-intelligible labels.

By configuring a workflow program document into a uniform framework, segmenting each workflow into paths corresponding to different outcomes, and identifying each workflow using human-intelligible labels, new workflows and/or new paths may be inserted into the workflow program document straightforwardly without requiring specialist knowledge. Moreover, the segmentation of the workflows and paths means that modification, addition or deletion of a workflow or a path does not stop or immediately affect the execution of the workflow program document, such that these modification, addition or deletion can be made "on the fly" while the workflow program document is running. As such, the workflow program document can be updated, or errors therein can be corrected, during execution without interrupting the process.

In the conventional approach, a process is segmented according to actors, with a dedicated route for each actor. The present approach differs from the conventional approach in that different labels may be assigned to a given route associated with the same actor, for example to differentiate different portions of a timeline of the given route. For example, referring to FIGS. 3A and 3B, the labels choosePart and sendToSales both form part of the "Sales" route, but each forms a different portion of the timeline. This feature facilitates further segmentation of the process, which in turn facilitates an automation of error reporting and associated improvement of the various functions within the process.

As explained above, conventional methods of capturing and automating a complex process generally relies on graphics representation such as flow charts to describe the process. For complex processes, this often spans several pages or results in very large images, adding to the complexity of automating the process. The textual representation used for the present workflow program document results in a more intelligible document which is capable of both showing a high level view (e.g. by grouping and minimising paths together) and a detail view within the same document.

Figure 4:
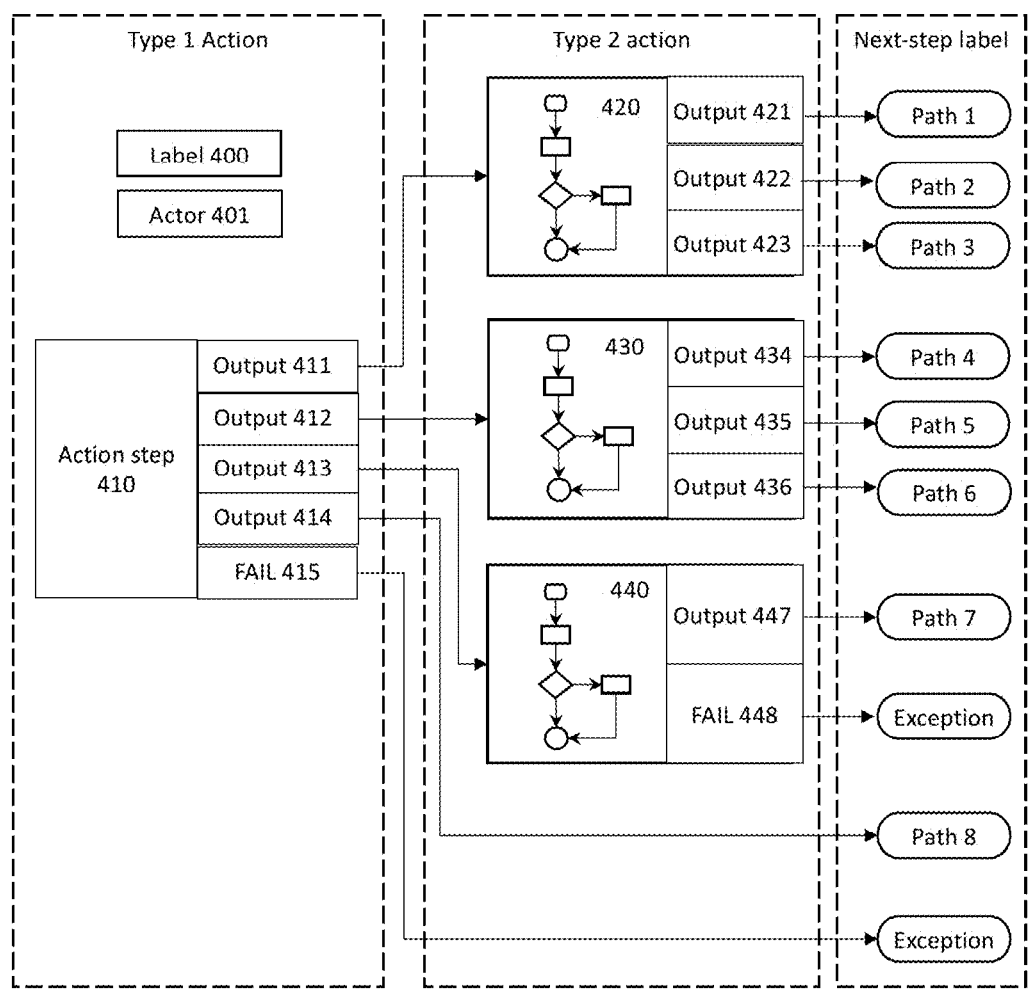
FIG. 4 shows schematically a workflow based on a workflow program document according to an embodiment.

FIG. 4 depicts an exemplary workflow, such as a workflow illustrated in FIGS. 3A and 3B, according to an embodiment. A workflow including both type 1 action and type 2 action is shown in FIG. 4 for the purpose of illustration only. It should be noted that it is not essential, according to the present approach, for a (low-level) workflow to include both a type 1 (constrained) action and a type 2 (unconstrained) action; in many cases only one of the two is required.

As shown in FIG. 4, the exemplary workflow is identified by a human-intelligible label 400, and an actor (e.g. "Sales", quality assurance "QA", "Manufacturing", "Additional Dept", "Paintshop", "Administrator", or any other predetermined personnel, machinery, software function, etc.) who performs the action(s) of the workflow is identified by a human-intelligible label 401. The workflow begins with a type 1 action step 410, the performance of which leads to one or a plurality of outputs 411, 412, 413, 414, for example based on satisfying one of a plurality of conditions (e.g. different sizes, categories, etc.) or based on a decision (e.g. approved or rejected). One or more of the plurality of outputs may lead to a corresponding type 2 (unconstrained) action step, while one or more of the plurality of outputs (e.g. output 414) may lead to a corresponding next-step label that identifies the next sequence to which the workflow proceeds (e.g. Sequence 8). There may be occasions when the performance of action step 410 fails to produce an output, for example when none of the conditions are met, in which case the action step 410 returns a failure 415, and the workflow is diverted to an exception path (explained below).

Each one of the plurality of outputs 411, 412, 413 leads to a different type 2 action step 420, 430, 440. A type 2 (unconstrained) action step differs from a type 1 (constrained) action step in that a type 2 action step can comprise a series of actions or running a sub-routine of programming that is outside of the workflow document (the sub-routine can be written, or example, in C Sharp, or another conventional linear programming language). For example, a type 2 (unconstrained) action step may be automated location and retrieval of a component part, automated assembly of a component part to an object, or generation of a certificate of quality. Each of the type 2 action steps 420, 430, 440 leads of one of a plurality of outputs 421, 422, 423, 434, 435, 436, 447 (e.g. component part A, component part B, component part C, etc.). Each output 421, 422, 423, 434, 435, 436, 447 then leads to a corresponding next step identified by a human-intelligible next-step label, which identifies a path—Path 1, Path 2, Path 3, Path 4, Path 5, Path 6, Path 7, Path 8—to be followed from the present workflow. It should be noted that Path 1, Path 2, Path 3, Path 4, Path 5, Path 6, Path 7, Path 8 need not represent different sequences, and some of the next-step labels may be the same in cases where different action steps or different outputs of an action step leads to the same next step, and one or more next-step labels may be completion of the process. There may be occasions when the performance of a type 2 (unconstrained) action step fails to produce an output, for example when a series of actions fail to execute to completion, in which case, as shown with action step 440, a failure 448 is returned and the workflow is diverted to an exception path.

FIG. 5 illustrates an exemplary implementation of the workflow program document of FIGS. 3A and 3B. For ease of reference, some of the columns shown in FIGS. 3A and 3B have been removed in FIG. 5.

In the present example, the process begins with the label "choosePart" (Ref 1-4) by actor "Sales". As can be seen in FIG. 5, this workflow has only type 2 (unconstrained) action and so the workflow proceeds to action step 2 "Part Lookup". It is determined that the required part is a custom manufactured part and so the performance of action step 2 returns the output "Custom Manufacture" (Ref 3). If the part is successfully located and retrieved, the workflow returns the outcome as "Success" and proceed to the next-step label "sendToSales".

The workflow program document is then read to proceed to "sendToSales" (Ref 5-9) by actor "Sales", as shown by route 1. This workflow involves first performing a type 1 (constrained) action step of routing, where a decision is made to determine where the part is sent. This may be performed by a human operator, or a software function or AI agent by selecting an option from a plurality of options e.g. stored on a database based on one or more criteria or specified in a document. In the present example, it is determined that the part is to be sent for painting (Ref 8) and no type 2 (unconstrained) action step is required. The output of action step 1 leads to the corresponding next-step label "sendToPaintshop".

The workflow program document is again read to proceed to the workflow "sendToPaintshop" (Ref 19-20), as shown by route 2, performed by actor "Paintshop", which involves a type 2 (unconstrained) action step "Painting". Again, this action step may be performed by a human operator or by robotics controlled by appropriate software. Once the painting of the part completes, the action step 2 returns an outcome of success that leads to the corresponding next-step label "sendForFinalQA" (Ref 19).

The workflow program document is again read to proceed to the workflow "sendForFinalQA" (Ref 21-22), as shown by route 3, performed by actor "QA", which involves a type 1 (constrained) action step "Approval". Again, this action step may be performed by a human operator or by sensors coupled to an appropriate control device. If it is determined that the painted part passes quality assurance and is approved (Ref 21), the workflow proceeds to the corresponding next-step label "sendToShipping".

The workflow program document is again read to proceed to the workflow "sendToShipping" (Ref 23), as shown by route 4, which is performed by actor "Sales" and involves a type 2 (unconstrained) action step "Ship Part". This action step may be performed by a human operator or by automated robotics. Once the action step 2 is completed, the process is completed.

It has been anticipated that a workflow program document may include conditions or filters specifying which objects or tasks individual actions are applicable to, which may include lists and/or wildcards.

Parameters and attributes of an object or a task that is the subject of the process being automated may be defined in an object or task definition document separate from the workflow program document, for example in a high-level programming language editable only by authorised and/or experienced programmers or supervisors. The object (or task) parameters and/or attributes may be manually adjusted for an individual object (or task), and the object (or task) may be reinserted in the workflow at a chosen point. For example, if a machined object has a dimension parameter out of normal range, it may be diverted from the workflow and sent for correction treatment and have one or more parameters manually adjusted, and then reinserted at an appropriate point in the workflow with modified parameters, for example at a preceding action step that checks the object parameters. It has been anticipated that an additional column may be included in the workflow program document to indicate when an object has been manually treated, or it may be included into the object or task definition document without modifying the workflow program document. In cases where it is determined that a given workflow or action step frequently leads to manual intervention, such "manual intervention" may then be defined as an additional low-level workflow.

Document Signing Process

FIGS. 6A and 6B show another example of a workflow program document for automation of a document generating and signing process. Similar to FIGS. 3A and 3B, FIG. 6A illustrates the left half of the exemplary workflow program document while FIG. 6B illustrates the right half of the exemplary workflow program document.

As can be seen in FIGS. 6A and 6B, although the process to be automated is very different from the manufacturing process shown in FIGS. 3A and 3B, the present document generating and signing process can be coded using the same framework with each workflow organised in the same manner in a series of rows with the same columns.

The workflow program document FIGS. 6A and 6B is read and executed in the same way as the workflow program document of FIGS. 3A and 3B, as shown in FIG. 7. The process begins with the label "start" (Ref 1-5), with an action step 2 "Add Document" performed by actor "Sales". The performance of the action step 2 returns an output of "Internal review", which corresponds to the next-step label "sendToSales".

The workflow program document is read and the workflow proceeds to "sendToSales" (Ref 6-11), as shown by route 1. Performance of the action step 1 "Routing" by actor "Sales" outputs "Send for Signature" (Ref 10), which leads to the action step 2 "Add Document". Upon completion of the action step 2, the workflow ends with the next-step label "sendForSignatures".

The workflow program document is again read and the workflow proceeds to "sendForSignatures" (Ref 12-14), as shown by route 2. The actor "Sales" performs the action step 2 "Signatures", and upon completion (Ref 12), the workflow ends with the next-step label "sendToFulfilment".

The workflow program document is again read and the workflow proceeds to "sendToFulfilment" (Ref 21), as shown by route 3. The actor "LegalQueue" performs the action step 1 "Review" and the process is completed.

Similar to the example of FIG. 5, the actors herein may be a human operator, a software function, an AI agent, etc., such that the action steps may be manually performed or performed by hardware or machinery controlled by appropriate control software.

Following is a more detailed description of how the underlying technology works (with an example of how it works) to accomplish these tasks. Starting with the Next-Step Label from FIG. 6B row 1 ("sendToSales"), the following techniques will be used to set up the next step in the high-level workflow.

The following filters are used to extract parameters for the Simple Step.
- Filter A is designed to identify all rows (paths) that apply to the sendToSales sequence.
    - Filter all rows where (Label==sendToSales).
- Filter B is designed to identify all rows (paths) which are output from filter A (that is, which satisfy filter A's criteria) where the Condition holds true (the Condition is shown in the second column of the workflow program document in FIG. 6A, and an example is shown where the value of the transaction for which the document pertains, must be greater than 5000 dollars, for example).
    - Filter rows where Condition holds true (i.e. value>5000) or where the row does not have a condition (i.e. "*").
- Filter C will take the first row from filter B and look for the Actor column. This identifies who should execute Step 1
    - This could be an individual or could be assigned to an internal group where any person in the group might complete the step, or could be performed by an artificial intelligence agent.
- Filter D will take the first row from filter B and look for the Action Step 1 column. This identifies the Simple Step to execute as part of step 1.
- Filter E will take the first row from filter B and look for the Comms column. This identifies the communication parameters (for example, E01 identifies the information or content which needs to be communicated with the actor who needs to complete the Simple Step, such as instructions related to the action they need to take, or a communication which is sent to them to inform them of a task that needs to be completed, as well as instructions regarding how to complete the task as accurately and completely as possible) to be used by the Action Step 1.

Filters for the Simple Step Example (assumption: value<5000)
- Filter A will identify rows 6-12 as applying to the sendToSales sequence.
- Filter B will identify rows 6-8 and rows 10-11 as meeting the conditions.
- Filter C will identify the Actor to complete the Simple Step as "Sales".
- Filter D will identify "Routing" as the Action which needs to be completed for Action Step 1
- Filter E will identify "E01" as the communication parameter to be extracted from the Communication templates Filter Overview (Simple Step)
- The filters above leave us with the following Simple Step. A Routing Step will be executed using the communication parameters E01, and will have the following options for the Sales user to select from: Send to Commercial, Send to Legal, Send to Other Reviewer, Send for Signature, Void Document (these are the values in the Action Step 1 Output column which match the rows identified by filter B).

Simple Step Summary (Explanation)
- The Sales user will be given a task to complete where he/she is presented with Options for what needs to happen next in the contract creation process. The Options will be the values from the Action Step 1 Output column after the filters were applied. The Sales user will then make a selection from the list of options, Send for Signature for this example. This then is used to identify the 'Next-Step Label' (which will be "sendForSignatures") to be used next. We then continue on to FIG. 6B and start filtering for the Complex Step (sub-routine).

The following filters are used to extract parameters for the Complex Step.
- Filter A is designed to identify all rows (paths) that apply to the sendForSignatures sequence.
    - Filter all rows where (Label==sendForSignatures).
- Filter B is designed to identify all rows (paths) from filter A where the Condition holds true.
    - Filter rows where Condition holds true (i.e. value>5000) or where the row does not have a condition (i.e. "*").
- Filter C will take the first row from filter B and look for the Actor column. This identifies who should input relevant information during the execution of the Complex Step, that is, who should input information that is requested by the presentation of automatic prompts during the running of the sub-routine.

This could be an individual or could be assigned to an internal group where any person in the group might complete the step. This could also be performed by an artificial intelligence agent.

Filter D will take the first row from filter B and look for the Action Step 2 column. This identifies the Complex Step (sub-routine) to be executed. In this example, the Complex Step (sub-routine) has the title of "Signatures" and when this sub-routine is executed, the following actions are automatically carried out under the control of the software (sub-routine), for example, the actor is asked to confirm the recipient details for the entity (e.g., customer) who needs to sign the document, and then the sub-routine automates the entire signature process, ensuring that completed signatures are received from all relevant parties, and also deals with exceptions, where if a party declines to sign, the sub-routine handles this, and returns to the actor to ask what needs to happen to handle the exception (for example, does Legal need to modify, etc).

Filter E is designed to run after the subroutine completes and is designed to identify the rows where the Outcome of the Complex Step/Subroutine is matched (for example, a Failure outcome results). A Failure outcome indicates that the document was not signed as a result of the "Signatures" sub-routine execution.

Filter F is designed to be run after the Complex Step/Sub-routine completes and starts with the results from Filter E and is designed to check the Action Step 2 Output from the Complex Step/Sub-routine (e.g. Requires Legal Advice)

Filter for Complex Step (assumption: The Signatures Subroutine will have outcome 'Failure' with output 'Requires Legal Advice')

Filter A (see FIG. 6A) will identify rows 12-14 as applying to the sendForSignatures sequence.

Filter B will identify rows 12-14 as meeting the conditions.

Filter C will identify the Actor to complete the Simple Step as "Sales".

Filter D will identify "Signatures" as the Action/Sub-routine which needs to be executed for Action Step 2 (see FIG. 6B)

Filter E will be run after the "Signatures" Subroutine has been executed and will match rows 13-14 (where Outcome='Failure'), meaning that the result of the sub-routine execution is that the Outcome is Failure. For example, the outcome of the sub-routine is Failure due to signatures not received.

Filter F will be run after Filter E and will match row 14 after seeing that the output returned from the "Signatures" Subroutine='Requires Legal Advice'. The sub-routine provides the outcome of Failure but it also provides further information that the Failure outcome requires legal advice, another option is that the Failure outcome requires an update, as shown in FIG. 6B. It is also possible to have a Failure without a specific output if the sub-routine does not return a specified output.

Filter Overview (Complex Step)

The filters above leave us with the following complex step, "Signatures". The "Signatures" Subroutine will be run and all actions needing to be acted upon will be completed by the Sales User. Based on whether the subroutine completes as expected or not an Outcome of "Success" or "Failure" will be returned. There will then be another filter that runs after we have received the subroutine Outcome. In our example there are no further filters if the Outcome comes back as "Success", but as in our example where the Outcome comes back as "Failure" we will filter for the correct Next-Step Label based on the Action Step 2 Output value returned by the subroutine.

Complex Step Summary (Explanation)

The "Signatures" subroutine will execute based on the filters above. During the subroutine there will be a step assigned to the Sales user to send the contract for Signatures. There are two possibilities here: 1. The Sales user realizes that they need Legal output before they send for signatures and decide not to send but first mark the contract as needing legal assistance (it could also be the case that the subroutine execution results in the contract being marked as needing legal assistance without the need for the sales person to make that decision). 2. The Sales user sends for Signatures, the client decides not to sign and sends back a comment, the sales user then realizes based on the comment that they need legal assistance and mark the contract as needing legal assistance. The subroutine completes with an Outcome="Failure" (due to the fact that the main goal of the subroutine is to get the contract signed) and an Output="Requires Legal Advice" is generated. The Next-Step Label is then determined based on the Outcome and Output from the subroutine (this will be "sendToLegal")

The filters and filtering operations described above are preferably carried out by the operation of software programming code, developed in a linear programming language, such as C Sharp. Such programming code sits outside of the workflow program document.

Figure 8:
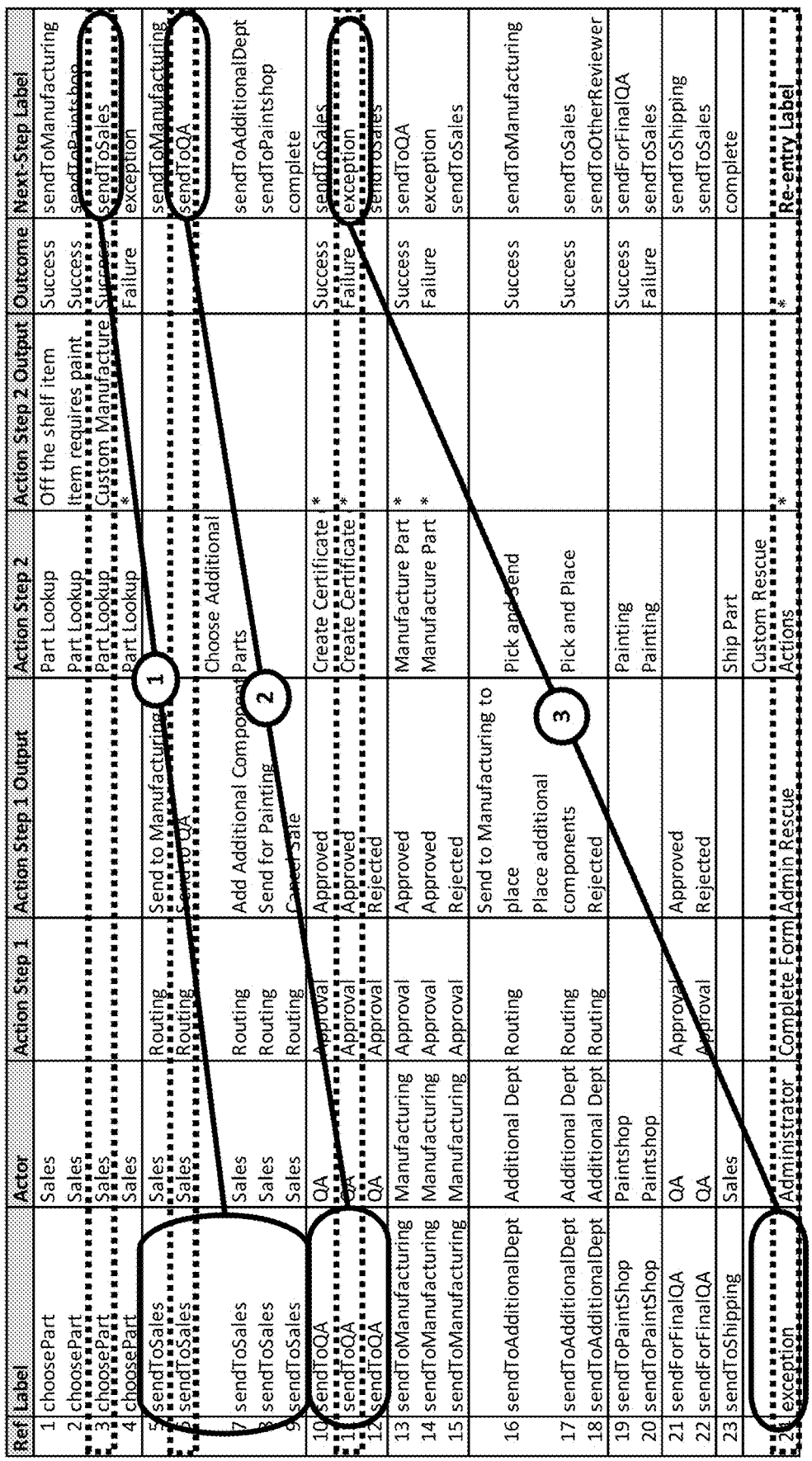
FIG. 8 shows an example of workflow routing to exception based on the workflow program document of FIGS. 3A and 3B.

FIG. 8 illustrates an example based on FIGS. 3A and 3B in which execution of the workflow program document encounters an unexpected or undesirable outcome. The process begins with the label "choosePart". The actor "Sales" performs the action step 2 "Part Lookup", which returns the output "Custom Manufacture" (Ref 3) with the corresponding next-step label "sendToSales".

The workflow program document is read and the workflow proceeds to the label "sendToSales", as shown by route 1. The actor "Sales" performs the action step 1 "Routing" and determines the output "Send to QA" (Ref 6) which corresponds to the next-step label "sendToQA".

The workflow program document is again read and the workflow proceeds to the label "sendToQA", as shown by route 2. The actor "QA" performs the action step 1 "Approval" and outputs "Approved". The action step 1 output leads to the action step 2 "Create Certificate", which fails to complete (Ref 11) and leads to the corresponding next-step label "exception".

The workflow program document is again read and the workflow is diverted to the exception path (Ref 24) for exception handling, as shown by route 3. The actor "Administrator" is called to perform one or more rescue or remedial actions to resolve the exception. Once the exception is resolved, the exception path ends with a corresponding re-entry label, which directs the workflow back to a re-entry point in the workflow program document that is the sequence where the exception occurred.

Exception Handling

An exception handler may be implemented in any suitable and desired manner, for example by providing a plurality of selectable options including providing a patch for the workflow program document and/or providing an option to bypass a problematic workflow. A non-limiting exemplary exception handling interface is shown in FIG. 9, in which an exception handler form is presented. The interface comprises elements that allows an administrator to input data and/or instructions (e.g. to select an option, to substitute a part of the workflow program document with a correction or update, etc.) and optionally elements that allows output of information to the administrator (e.g. options for exception handling, prompts for input, error messages for invalid inputs, etc.).

The exception handling interface may be displayed to an exception handler such as a predetermined actor (or group of actors), for example the actor associated with the sequence that leads to the exception, to a designated administrator, and/or to an AI agent trained to handle exceptions. The exception handling interface may be displayed in conjunction with the workflow program document, e.g. in the form of a pop-up window, or it may be sent e.g. as a link or a document to the exception handler or multiple exception handlers via e.g. email, instant messaging, notification, etc. Once exception handling is completed, the workflow can be directed back to the point where the exception occurs, and the process continues to execute.

There may be many different occasions when an exception may occur. For example, unforeseen behaviour in a low-level workflow that was not coded such as an incorrect choice in a complex form, a change in external processes that the system was not designed to handle, a process of progressive coding in which only successful paths exist and failure paths have not been coded or captured.

oper to make a change that was not handled in a related area. Such an issue may occur especially during long complex developments.

End user behaviours can be unpredictable, especially when under time pressure or due to a lack of experience with new systems. Due to time and cost pressures, enterprise systems often do not cater for every eventuality, relying on extensive end user training. In the event that a user makes a mistake or exhibits unexpected behaviours, the platform often fails and the object or task being processed is discarded. By enabling interception of such failures and errors facilitated by the present exception handling process, an experienced administrator or trained AI agent may identify the exception and take corrective or remedial actions without interrupting the execution of the process, thereby conserving time and resources. The exception handling functionality is preferably implemented by software programming code developed in a linear programming language such as C Sharp.

In some embodiments, the same interface may be used to modify the workflow program document. For example, if during execution, the process encounters an unexpected or undesired condition or outcome that interrupts a particular workflow, the process may be allowed to proceed by re-routing from the interrupted workflow to a next workflow, while a copy of the workflow program document is created to investigate and resolve the interrupted workflow using the same interface as FIG. 9. Once the unexpected or undesired condition or outcome is resolved, the process may be redirected back to the now-resolved interrupted workflow.

Report Generation

According to present embodiments, due to the repetitive nature of the sequences in a workflow program document, the generation of a progress report may be automated without involvement from a human operator. In particular, coding the workflows of a complex process using the uniform framework of the present approach enables automated reporting capable of capturing every path that is taken and in a sequential manner, for example:

| Ref: | Action Step: | Actor: | Options: | Workflow output: | Workflow Result: | Duration |
|---|---|---|---|---|---|---|
| 1 | start | jane@example.com | | Review Internally | Success | 0:05 h |
| 7 | sendToSales | jane@example.com | Send to Legal | | | 0:03 h |
| 16 | sendToLegal | pete@example.com | Approved | | Success | 05:00 h |
| 10 | sendToSales | jane@example.com | Send for Signature | | | 0:05 h |
| 12 | sendForSignatures | jane@example.com | | | Success | 20:00 h |
| 21 | sendToFullfilment | john@example.com | | | | 10:00 h |

When execution of the process encounters an error and is diverted to an exception path, the system may generate a report describing the error that caused the exception, to suggest possible causes for the error, to suggest possible solutions for resolving the exception, to provide a link to each suggested solution that directs an operator to a corresponding section of the workflow program document, or to provide an editable patch for modifying the workflow program document.

The development process of an end-to-end system is often executed across several technical resources, as well as business resources that set the requirements. The various actors may be working independently, causing one devel- The automatically generated report includes an identifier from the workflow program document that uniquely identifies the path, e.g. "Ref", as well as an identifier (e.g. an email address of an individual) of the actor that performed the action on behalf of a queue or a group. The report can enable automated analysis to be performed, e.g. of the productivity of individuals in various roles within an organisation or the performance of machinery or software. Such a report can be easily and straightforwardly interpreted by human supervisors or software supervisory functions.

Approval Process

A common low-level workflow or series of low-level workflows for a complex process is an extended or complex approval process involving multiple actors and often with multiple dependencies. An example of such a complex approval process is illustrated as a flow diagram in FIG. 10.

An exemplary workflow program document for a complex approval process is shown in FIG. 11, which encode the approval process of FIG. 10. The exemplary workflow program document is defined using a variant of the tabular framework described above in relation to FIGS. 3A, 3B, 6A and 6B.

Similar to the high-level workflow of the workflow program documents of FIGS. 3A, 3B, 6A and 6B, the present approval process workflow program document is evaluated after each event, for example after each approval or rejection.

Referring to FIG. 11, the column "Approval" gives a label that uniquely identifies an approval category. The column "Approver" identifies the individual, group, queue, software function, etc. that is responsible for the corresponding approval step. The column "Approval Dependencies" identifies one or more "Approval" that must be confirmed to satisfy the dependency condition of the corresponding approval step before this approval step can complete. The column "Conditional" identifies additional conditions that must be met before the corresponding approval step can complete. The column "Terminal" identifies an approval step the rejection of which is terminal. If the "Terminal" column is marked as TRUE for a particular approval step, the entire approval sequence is aborted, and the workflow is returned to the originator who initiated the approval process if the corresponding approver rejects the approval step. If the "Terminal" column is marked as FALSE for a particular approval step, the approval sequence may continue regardless of the outcome of the approval step. The column "Human Selectable" identifies an approval step that, when marked TRUE, allows the originator to determine at runtime if the approval step is required or not.

The present workflow program document can be run as a sub-routine called by a type 2 (unconstrained) action step in the workflow program document of FIGS. 3A, 3B, 6A and 6B, or as a separate workflow program document to be run in parallel, prior or subsequent to the workflow program document of FIGS. 3A, 3B, 6A and 6B.

Figure 12:
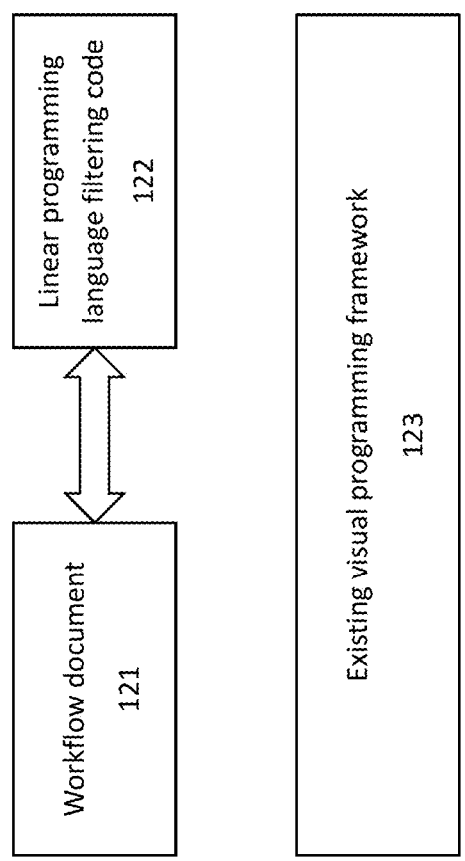
FIG. 12 shows a block diagram of a three part architecture for implementing the tool, according to an embodiment.

A method of developing and using a new tool for the automation of a complex workflow, according to a preferred embodiment of the present invention, and as shown in FIG. 12, includes the development and use of the workflow program document 121 described above, and also the development and use of the linear programming code 122 mentioned above, outside of the workflow program document, for implementing the filtering steps on the rows and columns of the workflow program document. The development and use of the new tool also includes the selection and reuse/use of an existing visual representation programming tool or framework 123, such as the DocuSign CLM tool, such that only the basic framework of such existing tool is used (the basic wireframe structure, as it exists, "out of the box"), such that basic functions of such existing tool (such as a routing function) can be called upon by the new tool without having to develop the software code for such existing basic functions (such as routing).

Figure 13:
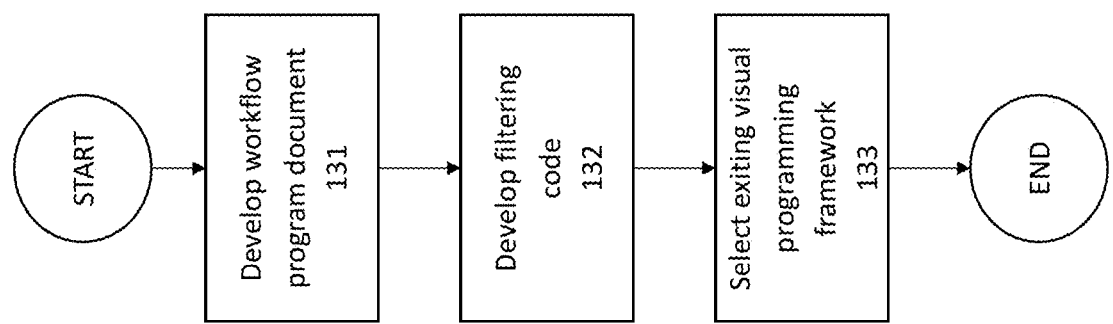
FIG. 13 shows a flowchart for a method of developing the tool, according to an embodiment.
Figure 14:
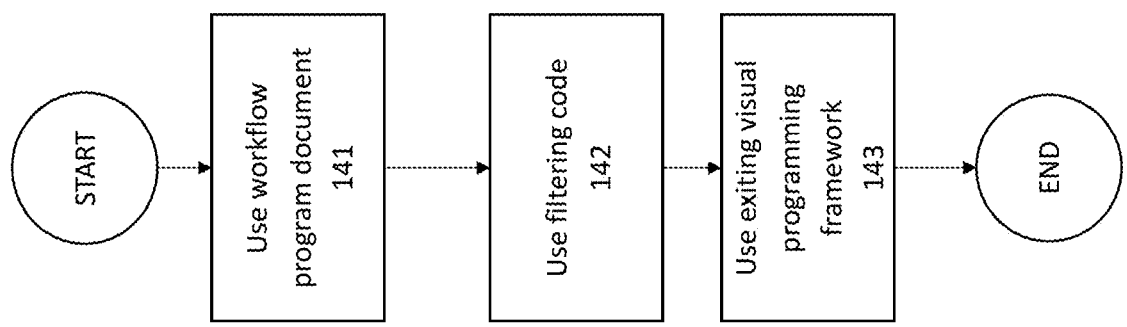
FIG. 14 shows a flowchart for a method of using the tool, according to an embodiment.

A method of developing the new tool is shown in FIG. 13, and has a first step 131 of developing the workflow program document 121, a second step 132 of developing the filtering code 122 using a linear programming language, such as C Sharp, and a third step 133 of selecting an existing visual programming framework 123.

A method of using the new tool is shown in FIG. 4, and has a first step 141 of using the workflow program document 121, a second step 142 of using the filtering code 122, and a third step 143 of using the existing visual programming framework 123, in the manner as herein described.

In the preferred embodiment, the use of the existing visual representation tool involves not changing the existing visual representation tool at all, it is used by the new tool in the same state of the existing tool regardless of the specific workflow that is being implemented by the new tool. It is used for its existing basic functionality, as a basic skeleton, or wireframe framework. The bespoke modifications to create a new specific workflow are carried out by the new workflow program document taken in combination with the linear programming code as well as the existing basic functionality of the existing visual representation language tool.

As an example, if an action of routing is to be implemented using the new tool, the routing action is listed in the appropriate table of the workflow program document, it is then filtered using the filtering functionality of the linear programming code (e.g., written in C Sharp), and the linear programming code makes a call to the existing routing function included in the native out of the box basic functionality of the existing visual representation programming language tool. There is no need for the routing functionality to be re-coded in the linear programming language, as such basic functions are already coded in the existing visual representation programming language tool.

There are many different types of MLAs (Machine Learning Algorithms) known in the art. Broadly speaking, there are three types of MLAs: supervised learning-based MLAs, unsupervised learning-based MLAs, and reinforcement learning based MLAs.

Supervised learning MLA process is based on a target—outcome variable (or dependent variable), which is to be predicted from a given set of predictors (independent variables). Using these set of variables, the MLA (during training) generates a function that maps inputs to desired outputs. The training process continues until the MLA achieves a desired level of accuracy on the validation data. Examples of supervised learning-based MLAs include: Regression, Decision Tree, Random Forest, Logistic Regression, etc.

Unsupervised learning MLA does not involve predicting a target or outcome variable per se. Such MLAs are used for clustering a population of values into different groups, which is widely used for segmenting customers into different groups for specific intervention. Examples of unsupervised learning MLAs include: Apriori algorithm, K-means.

Reinforcement learning MLA is trained to make specific decisions. During training, the MLA is exposed to a training environment where it trains itself continually using trial and error. The MLA learns from past experience and attempts to capture the best possible knowledge to make accurate decisions. An example of reinforcement learning MLA is a Markov Decision Process.

It should be understood that different types of MLAs having different structures or topologies may be used for various tasks. One particular type of MLAs includes artificial neural networks (ANN), also known as neural networks (NN).

Neural Networks (NN)

Generally speaking, a given NN consists of an interconnected group of artificial "neurons", which process information using a connectionist approach to computation. NNs are used to model complex relationships between inputs and outputs (without actually knowing the relationships) or to find patterns in data. NNs are first conditioned in a training phase in which they are provided with a known set of "inputs" and information for adapting the NN to generate appropriate outputs (for a given situation that is being attempted to be modelled). During this training phase, the given NN adapts to the situation being learned and changes its structure such that the given NN will be able to provide reasonable predicted outputs for given inputs in a new situation (based on what was learned). Thus, rather than attempting to determine a complex statistical arrangements or mathematical algorithms for a given situation, the given NN aims to provide an "intuitive" answer based on a "feeling" for a situation. The given NN is thus regarded as a trained "black box", which can be used to determine a reasonable answer to a given set of inputs in a situation when what happens in the "box" is unimportant.

NNs are commonly used in many such situations where it is only important to know an output based on a given input, but exactly how that output is derived is of lesser importance or is unimportant. For example, NNs are commonly used to optimize the distribution of web-traffic between servers and in data processing, including filtering, clustering, signal separation, compression, vector generation and the like.

Deep Neural Networks

In some non-limiting embodiments of the present technology, the NN can be implemented as a deep neural network. It should be understood that NNs can be classified into various classes of NNs and one of these classes comprises recurrent neural networks (RNNs).

Recurrent Neural Networks (RNNs)

RNNs are adapted to use their "internal states" (stored memory) to process sequences of inputs. This makes RNNs well-suited for tasks such as unsegmented handwriting recognition and speech recognition, for example. These internal states of the RNNs can be controlled and are referred to as "gated" states or "gated" memories.

It should also be noted that RNNs themselves can also be classified into various sub-classes of RNNs. For example, RNNs comprise Long Short-Term Memory (LSTM) networks, Gated Recurrent Units (GRUs), Bidirectional RNNs (BRNNs), and the like.

LSTM networks are deep learning systems that can learn tasks that require, in a sense, "memories" of events that happened during very short and discrete time steps earlier. Topologies of LSTM networks can vary based on specific tasks that they "learn" to perform. For example, LSTM networks may learn to perform tasks where relatively long delays occur between events or where events occur together at low and at high frequencies. RNNs having particular gated mechanisms are referred to as GRUs. Unlike LSTM networks, GRUs lack "output gates" and, therefore, have fewer parameters than LSTM networks. BRNNs may have "hidden layers" of neurons that are connected in opposite directions which may allow using information from past as well as future states.

Residual Neural Network (ResNet)

Another example of the NN that can be used to implement non-limiting embodiments of the present technology is a residual neural network (ResNet).

Deep networks naturally integrate low/mid/high-level features and classifiers in an end-to-end multilayer fashion, and the "levels" of features can be enriched by the number of stacked layers (depth).

To summarize, the implementation of at least a portion of the one or more MLAs in the context of the present technology can be broadly categorized into two phases—a training phase and an in-use phase. First, the given MLA is trained in the training phase using one or more appropriate training data sets. Then, once the given MLA learned what data to expect as inputs and what data to provide as outputs, the given MLA is run using in-use data in the in-use phase.

MLA's can advantageously be applied to the automation of complex processes, to identify patterns in such processes which already exist, and to use such identified patterns to help better automate processes going forwards. The workflow data in a series of workflow program documents can be recorded, for example, in a log document, while the workflow program documents are being processed by the software components, and the log document is then analyzed by an MLA. There are similarities between components of processes, and these similarities can be identified and used by an MLA to predict outcomes for further processes.

A log document is used to track the execution history of every workflow instance, and is created at the start of the workflow instance. At the end of the processing of every path, a new log line is appended to the end of the log document to record the results of having processed that path. For example, referring to FIGS. 6a and 6b, a typical line in the logfile will contain:

<Date+Timestamp>:<Ref>, <Label>, <Actor>, <Action Step 1 Output>, <Action Step 2 Output>, <Outcome>.

These values will match the workflow program document values that were interpreted. In the example above, 'Actor' refers to the unique individual that completed the step, for example if it was assigned to a queue, which unique individual took action on behalf of the queue. If the task is assigned to a variable and a group of actors, 'Actor' will return the unique individual who took action.

The log document allows the administrator to uniquely identify the historic steps that were taken, by whom and when, allowing an MLA to interpret the history and identify patterns. The log document also allows the administrator to more easily debug an exception situation allowing the administrator to understand how the exception was reached.

These similarities become more apparent when encoded in a workflow program document and an MLA can be used to identify patterns. The MLA may identify repeated or similar sequences. Based on this, the MLA may suggest edits to a workflow program document. For example, as a process is being automated, the MLA may suggest steps to encode a component which is executed similarly to another component, or may suggest steps for use in a component of another process. Alternatively, small differences in similar sequences may be identified, for example, highlighted, to assist a user in determining if differences were intentional or if the processes might usefully be made more consistent. Possible errors may be identified, for example, if one portion of a workflow program document usually contains a particular step and it is omitted in one instance this may be flagged. Templates may be suggested from frequently used blocks.

The MLA can operate on workflow documents for a single process or may operate over multiple document instances for similar or dissimilar processes. The suggestions may be invoked when creating or amending documents or separately when reviewing documents. Suggestions may be provided during run time in the event of an exception.

Figure 15:
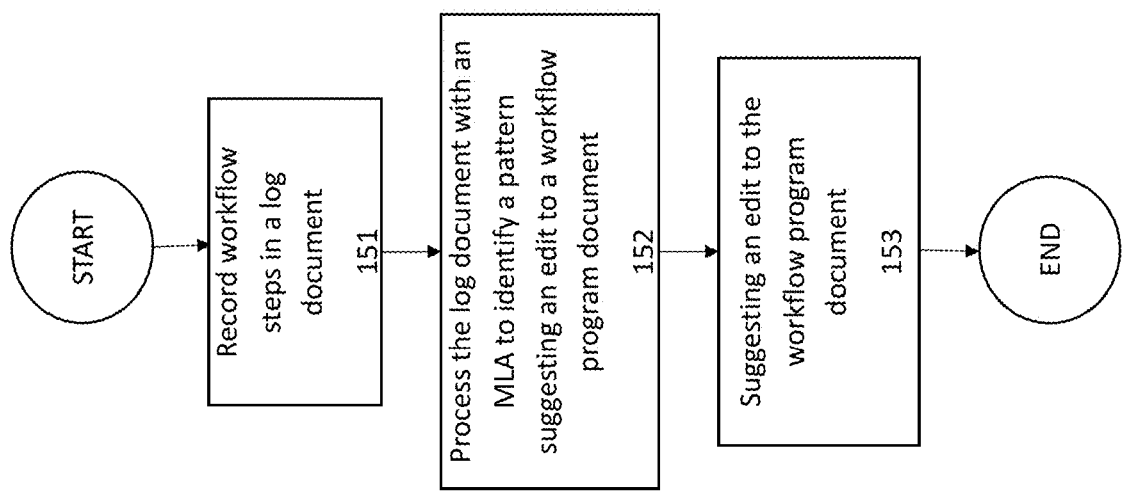
FIG. 15 shows a flowchart for a method of identifying a pattern using a machine learning algorithm, according to an embodiment.

Accordingly, as shown in the flow chart of FIG. 15, the invention provides a computer implemented method for identifying patterns in the automation of one or more processes, having steps of:

a) recording (step 151) workflow steps in a log document, the log document including data describing an execution history of processing of at least one workflow program document, where the workflow program document comprises rows and columns, where each row represents one of a plurality of paths through a portion of a process to an outcome of the portion of the process, and where each column represents a human readable label used to describe a component of the process;
b) processing (step 152) the log document with a machine learning algorithm to identify at least one pattern suggesting an edit to a workflow program document to be modified;
c) based on the identified pattern, suggesting (step 153) an edit to the workflow program document, wherein the edit comprises at least one of:
  a. a sequence of steps to perform a further component of an existing process to be automated;
  b. a sequence of steps to perform a component of a further process to be automated;
  c. an identification of similar sequences of steps to validate differences;
  d. a suggested modification of one or similar sequences for consistency;
  e. an identification of a possible error in a sequence of steps; or
  f. a suggestion of a template for creation of future workflow program documents.

Preferably, when the next step label indicates a next portion of the process, following the current portion of the process, to be an exception handling portion, the step of suggesting an edit provides to a user one or more suggested modifications to the workflow program document for the process, based on the exception.

Preferably, the machine learning algorithm receives input runtime data regarding the occurrence of at least one exception, and provides information suggesting an edit to a corresponding workflow program document for the process, based on such runtime data.

Preferably, the machine learning algorithm receives input runtime data concerning execution times and provides information suggesting an edit to a corresponding workflow program document for a process, based on such runtime data.

It will be clear to one skilled in the art that many improvements and modifications can be made to the foregoing exemplary embodiments without departing from the scope of the present technology.

What is claimed is:

1. A method of automating a process to process an object and/or perform a task comprising:
  identifying a higher level workflow related to the process and encoding the higher level workflow in a higher level workflow program document, which higher level workflow program document is both machine interpretable and presented and editable in human-intelligible form, the higher level workflow program document identifying:
  a set of actors who perform actions and/or make decisions, wherein the set of actors comprises one or more human operators, units within an organisation, machine-implemented tasks or a combination thereof, and wherein the actors are identified by human-intelligible labels;
  a sequence of action steps, each action step having an associated actor and one or more expected outcomes, wherein the action steps are identified by human-intelligible labels and comprises taking a decision and/or progressing processing of an object or task, wherein the action steps optionally include complex action steps definable by a lower level workflow;
  an identifier of a next step for each expected outcome, wherein a next step may include raising an exception;
  optionally identifying at least one lower level workflow related to an element of a process and encoding the or each lower level workflow in a lower level workflow program document, which lower level workflow program document is both machine interpretable and presented and editable in human-intelligible form, the or each lower level workflow program document identifying:
  optionally, additional actors not identified in other workflow program documents who perform actions and/or make decisions, wherein the set of actors comprises one or more human operators, units within an organisation, machine-implemented tasks, or a combination thereof, and wherein the additional actors are identified by human-intelligible labels;
  a sequence of action steps, each action step having an associated actor and one or more expected outcomes, wherein the action steps are identified by human-intelligible labels and comprises taking a decision and/or progressing processing of an object or task, and wherein the action steps optionally include complex action steps definable by another lower level workflow;
  an identifier of a next step for each expected outcome, wherein a next step may include raising an exception;
  wherein the action steps may include action steps of a first type defined in the higher level workflow document or one of the lower level workflow program documents and action steps of a second type comprising program operation steps to be performed by programming defined outside the workflow program documents;
  executing the process by running the workflow program documents using a computer runtime program to interpret the sequence of steps, wherein a change to the workflow program documents result in a change to the operation of the computer runtime program, and wherein the computer runtime program is arranged to report an exception in the runtime operation of the workflow to a supervisory function, which supervisory function has an interface enabling action to be taken including one of:
  ad hoc handling of the exception by one-off reassignment or adjustment of the task or object being processed which resulted in the exception and re-inserting the task or object into an existing workflow;
  augmenting or modifying one or more workflow program documents whereby subsequent tasks or objects will be handled according to the modified workflow program documents.

2. The method of claim 1, further comprising notifying an operator upon raising an exception or upon detection of an error while the workflow program documents are running.

3. The method of claim 1, wherein the sequence of action steps comprises determining a state of an object or task to determine a next step.

4. The method of claim 3, wherein determining a state of an object or task comprises determining that a component part for the object is received, determining that the object has been assembled, determining that the object has passed quality check, determining that a document has been generated, determining that a document has been reviewed.

5. The method of claim 3, wherein the next action step comprises passing the object to assembly, passing the object to quality assurance, passing the object to completion, sending a document to a predetermined actor for review, or sending a document to a predetermined actor for completion.

6. The method of claim 3, wherein the determining a state of an object or task is performed by a human operator, a software function and/or at least in part by an AI module.

7. The method of claim 3, wherein the set of actors comprises one or more of machine processes, fabrication, machining, finishing, surface treatment, electronics, assembly, machining quality control, or a combination thereof.

8. The method of claim 7, wherein the sequence of action steps comprises one or more of cut blank, polish, surface treat, check tolerances, install PCB, test sensors, or a combination thereof.

9. The method of claim 7, wherein the set of actors comprises one or more of sales, document preparation, legal, procurement, fulfilment, or a combination thereof.

10. The method of claim 9, wherein the sequence of action steps comprises one or more of generate pricing, check compliance, check lead times, send to customer, or a combination thereof.

11. The method of claim 9, wherein the workflow program document is arranged in tabular form in a table.

12. The method of claim 11, further comprising:
defining the sequence of action steps by a series of rows in the table; and
identifying, for each row:
an actor from the set of actors in a first column;
an action step from the sequence of action steps in a second column, the actor identified in the first column being associated with the action step;
an expected outcome associated with the action step in a third column; and
an identifier of a next step for the expected outcome identified in the third column in a fourth column.

13. The method of claim 11, wherein one or more rows of the table each comprises a plurality of action steps.

14. The method of claim 11, wherein action steps defined in the lower level workflow program document comprises a constrained action step corresponding to a single action defined in the lower level workflow program document, or an unconstrained action step corresponding to a series of operation steps defined in a separate program document outside the workflow program documents, or a combination thereof.

15. The method of claim 11, further comprising assigning an authority level for each actor indicating an extent to which the actor is authorised to edit the higher level and/or lower level workflow program document.

16. The method of claim 11, wherein the object or task to be processed is defined in an object or task definition document outside the workflow program documents, wherein the object or task definition document defines a set of parameters and/or attributes associated with the object or task.

17. The method of claim 16, wherein the associated set of parameters and/or attributes is defined in a high-level computing language and editable only by a predetermined actor or group of actors.

18. The method of claim 16, wherein the higher level workflow program document further identifies a predetermined communication format associated with each series of action steps, wherein when the identifier of a next step for an expected outcome of a first sequence of action steps associated with a first actor identifies a second sequence of action steps associated with a second different actor, the method further comprises, notifying the second actor in the predetermined communication format to perform the second sequence of action steps.

19. The method of claim 16, wherein each human-intelligible label identifying an actor or an action step comprises words, symbols and/or numbers carrying their common everyday meaning and comprehensible by a human operator.

20. The method of claim 19, further comprising identifying, by a label parser, an inconsistency in the human-intelligible labels, the label parser providing a suggestion for an inconsistent label.

21. The method of claim 20, further comprising:
upon raising an exception, generating a report identifying one or more issues that caused the exception; and
providing in the report a plurality of options for resolving the exception, the plurality of options comprising one or more of modifying a higher level workflow program document, modifying a lower level workflow program document, modifying a frequently-used workflow program document, including a new lower level workflow in a lower level workflow program document, manually bypassing a workflow or an action step, or manually adjusting a workflow or an action step; and
assigning a priority to each of the plurality of options for resolving the exception.

22. The method of claim 21, wherein the plurality of options is selectable, the method further comprising, upon an option being selected, presenting a part of the workflow program document on an interface when the one or more issues that caused the exception relates to the part of a workflow program document.

23. The method of claim 22, further comprising generating one or more editable patch comprising one or more element of a workflow program document corresponding to the identified one or more issues that caused the exception.

24. The method of claim 21, further comprising implementing a machine learning algorithm for monitoring the running of the workflow program documents so as to generate the plurality of options and/or the one or more editable patch.

25. The method of claim 21, further comprising, upon raising an exception in relation to a first sequence of action steps, notifying a first actor associated with the first sequence of action steps, or a predetermined human operator assigned to the first sequence of action steps, or a predetermined AI module, or a combination thereof.

26. The method of claim 21, further comprising providing for selection a plurality of editable workflow program document elements for compiling a final workflow program document.

27. The method of claim 26, further comprising providing a recommendation for an editable workflow program document element for compiling the final workflow program document.

28. The method of claim 26, wherein the lower level workflow program document comprises a plurality of tiers of lower level workflows.

29. The method of claim 28, further comprising assigning each lower level workflow in the lower level workflow program document to a tier based on a frequency of use thereof.

* * * * *